United States Patent
Kim et al.

(10) Patent No.: US 9,760,975 B2
(45) Date of Patent: Sep. 12, 2017

(54) DISPLAY DEVICE

(71) Applicant: LG ELECTRONICS INC., Seoul (KR)

(72) Inventors: Jaeho Kim, Seoul (KR); Dohyeon Kim, Seoul (KR); Namhyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/079,240

(22) Filed: Mar. 24, 2016

(65) Prior Publication Data
US 2017/0161868 A1   Jun. 8, 2017

(30) Foreign Application Priority Data
Dec. 7, 2015   (KR) ................ 10-2015-0172988

(51) Int. Cl.
*H05K 1/00*   (2006.01)
*G06T 3/20*   (2006.01)
*H05K 5/00*   (2006.01)

(52) U.S. Cl.
CPC ............. *G06T 3/20* (2013.01); *H05K 5/0017* (2013.01)

(58) Field of Classification Search
USPC ................................. 361/749, 748
See application file for complete search history.

(56) References Cited

U.S. PATENT DOCUMENTS

| | | |
|---|---|---|
| 2005/0243416 A1 | 11/2005 | Choi |
| 2011/0018820 A1 | 1/2011 | Huitema et al. |
| 2013/0127917 A1 | 5/2013 | Kwack et al. |
| 2014/0015402 A1 | 1/2014 | Ahn et al. |
| 2015/0155505 A1* | 6/2015 | Yamazaki ........... H01L 27/1266 257/40 |
| 2017/0013726 A1* | 1/2017 | Han ..................... H05K 1/028 |

FOREIGN PATENT DOCUMENTS

KR   1020140144029 A   12/2014

* cited by examiner

*Primary Examiner* — Andargie M Aychillhum
(74) *Attorney, Agent, or Firm* — Dentons US LLP

(57) ABSTRACT

A display device is disclosed. The display device includes: a housing; at least one roller configured to be positioned within the housing; a display portion including a display panel and a module cover; and a telescopic bar, one end of which is fixed to the interior of the housing and the other end is fixed to the bottom end of the display portion, wherein the display panel and the module cover are either in a first state where the display panel and the module cover are kept wound around the at least one roller or in a second state where the display panel and the module cover are kept unwound from the at least one roller, in contact with each other, and exposed out of the housing. The telescopic bar supports the back of a display portion in conjunction with the display portion, thereby allowing the display portion to remain flat.

20 Claims, 28 Drawing Sheets

FIG. 5(a)
FIG. 5(b)
FIG. 5(c)
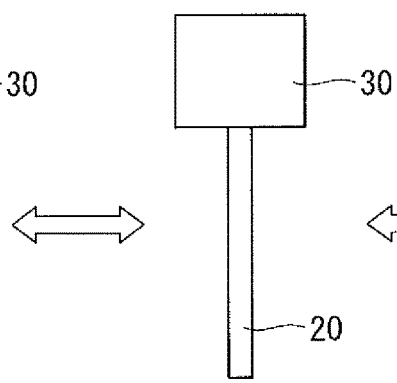
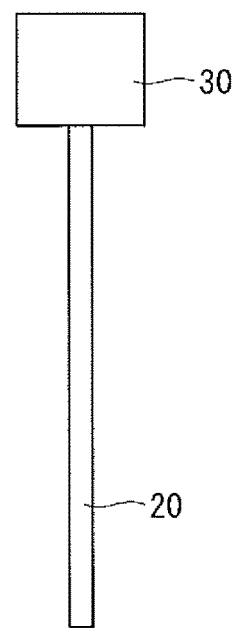

FIG. 6(a)   FIG. 6(B)   FIG. 6(c)
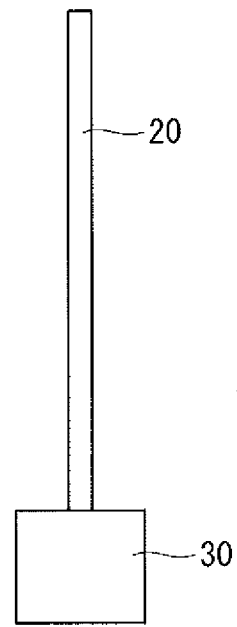
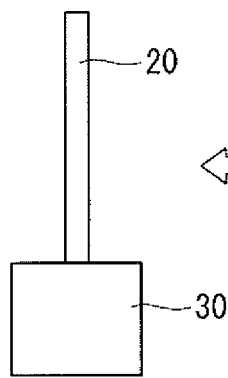
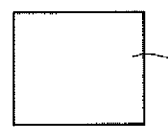
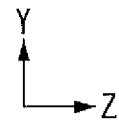

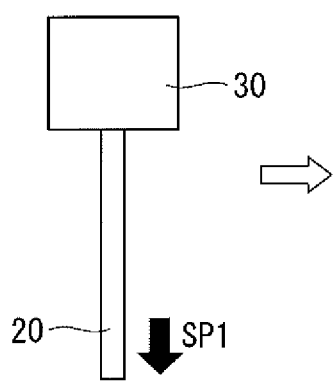
FIG. 7(A)
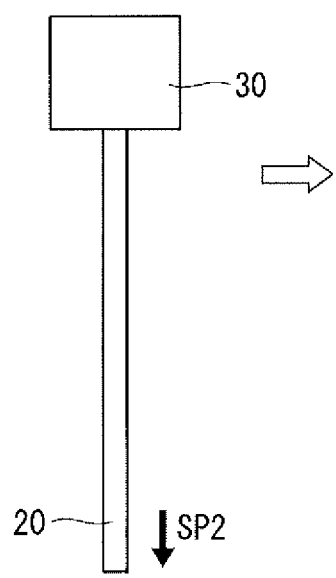
FIG. 7(B)
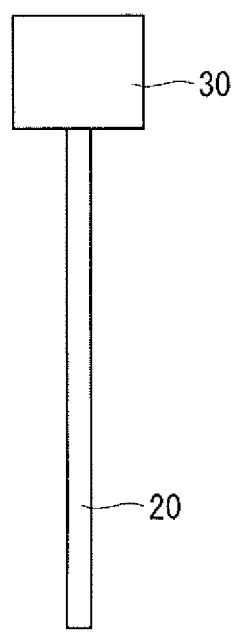
FIG. 7(C)
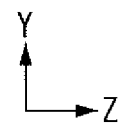

Fig. 28(a)
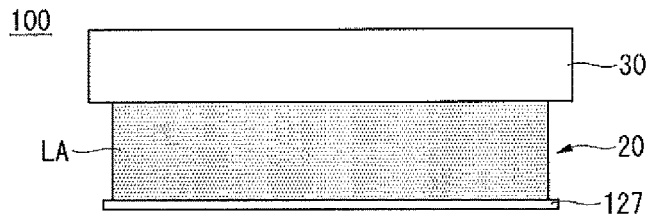
Fig. 28(b)
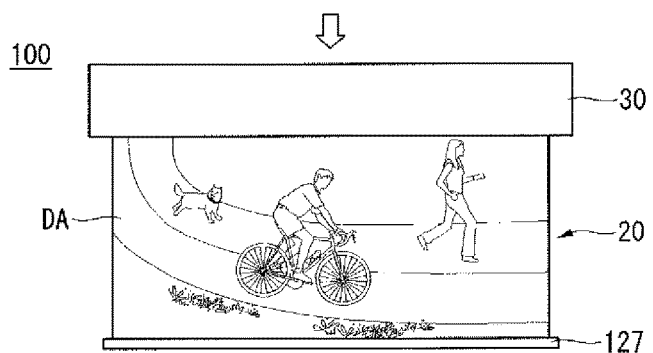
Fig. 28(c)
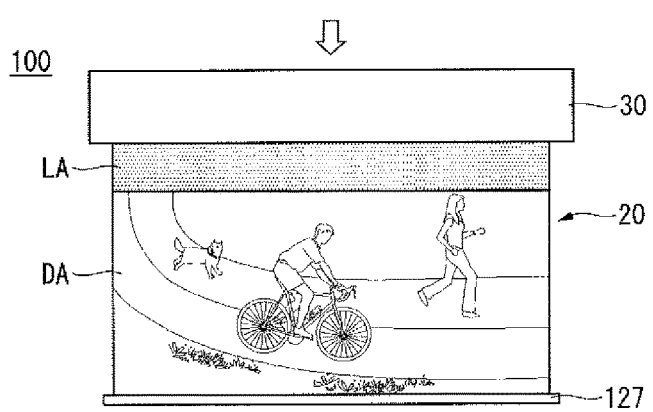
Fig. 28(d)
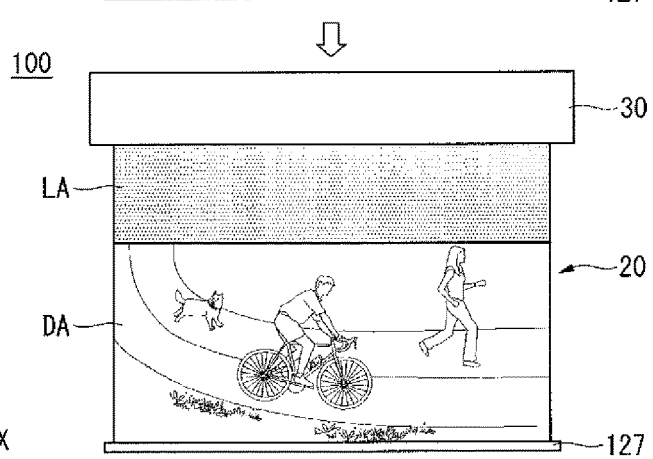
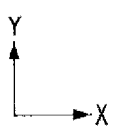

DISPLAY DEVICE

This application claims the benefit of Korean Patent Application No. 10-2015-0172988 filed on Dec. 7, 2015, the entire contents of which are incorporated herein by reference for all purposes as if fully set forth herein.

BACKGROUND OF THE INVENTION

Field of the Invention

The present invention relates to a display device, and more particularly, to a display device in which a telescopic bar supports the back of a display portion in conjunction with the display portion, thereby allowing the display portion to remain flat.

Discussion of the Related Art

With the development of the information society, demand for various displays is increasing. Responding to this demand, various displays such as LCDs (liquid crystal display devices), PDPs (plasma display panels), ELDs (electroluminescent displays), VFDs (vacuum fluorescent displays), etc. are being researched and used.

Among these displays, those using organic light-emitting diodes (OLEDs) offer superior luminance and viewing angles compared to LCDs and can be made extremely thin because they work without a backlight unit.

SUMMARY OF THE INVENTION

An aspect of the present invention is to provide a display device including: a housing; at least one roller configured to be positioned within the housing; a display portion including a display panel and a module cover; and a telescopic bar, one end of which is fixed to the interior of the housing and the other end is fixed to the bottom end of the display portion, wherein the display panel and the module cover are either in a first state where the display panel and the module cover are kept wound around the at least one roller or in a second state where the display panel and the module cover are kept unwound from the at least one roller, in contact with each other, and exposed out of the housing.

The display device may further include a controller configured to send a control signal, wherein the controller may be configured to send a control signal such that, when the display portion changes from the first state to the second state, a first speed at which the display portion is initially unwound from the roller and a second speed just before a set or input screen ratio is reached are different.

The first speed may be faster than the second speed.

The set screen ratio may be a screen ratio just before the display device is powered off.

The display device may further include: a controller configured to send a control signal; and an indicator configured to be attached to one side of the housing, wherein the controller may be configured to send a control signal to enable the indicator to show the percentage of the set or input screen ratio to the current screen ratio.

The display portion may include: a display area where the display screen is presented; and a letterbox area where the display screen is not presented.

The display area may be configured to be positioned at the center of the display portion, and the letterbox area may be configured to be positioned in the top and bottom parts of the display area.

At least one application may be shown in the letterbox area.

The display device may further include a controller configured to send a control signal, wherein the controller may be configured to send a control signal to move the display area within the display portion.

The controller may be configured to send a control signal to move the display area to the upper part of the display portion.

The controller may be configured to send a control signal to move the display area to the lower part of the display portion.

The telescopic bar may be configured to be stretched in conjunction with the display portion, during the transition from the first state to the second state.

The telescopic bar may include first to four bars, wherein the second to fourth bars may be configured to be sequentially inserted into the first bar.

The sides of the first to fourth bars that make contact with the module cover may be the same height.

The telescopic bar may be configured to be positioned at the center of the display portion.

The telescopic bar may be configured to be positioned on either side of the display portion.

The display device may further include a bottom bar configured to be positioned on one end of the display portion, wherein the bottom bar may include a magnetic material.

The display device may further include at least one speaker connecting portion configured to be positioned between the module cover and the display panel, the speaker connecting portion including: shakers configured to be positioned on the aprons; and transmitting portions configured to shield at least one side of the shakers.

The transmitting portions may include a magnetic material.

The transmitting portions may include a flexible material.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5(a), 5(b), and 5(c) are views showing a display device according to an exemplary embodiment of the present invention;

FIGS. 6(a), 6(b), and 6(c) are views showing a display device according to an exemplary embodiment of the present invention;

FIGS. 7(a), 7(b), and 7(c) are views showing a display device according to an exemplary embodiment of the present invention;

FIGS. 28(a), 28(b), 28(c), and 28(d) are views showing a display device according to an exemplary embodiment of the present invention.

DETAILED DESCRIPTION OF THE EMBODIMENTS

Figure 1:
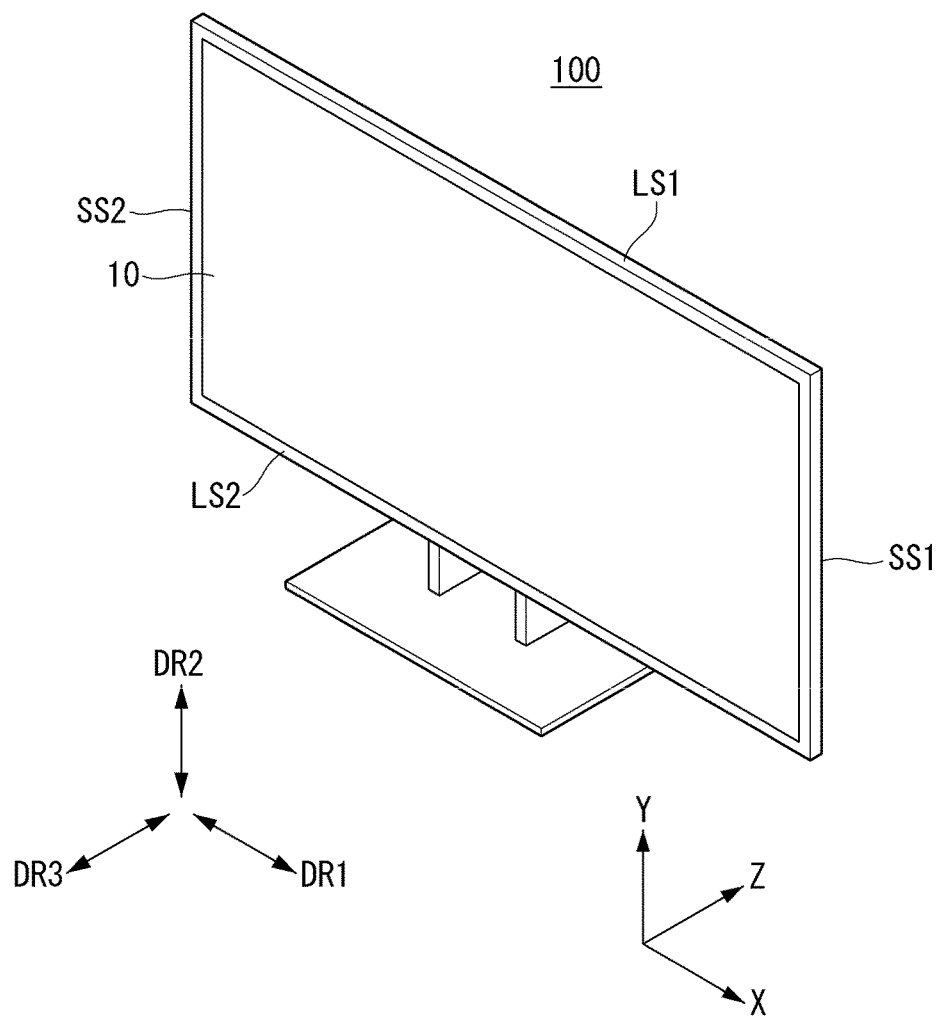
FIG. 1 is a view showing the configuration of a display device relating to the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to "or" being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely.

Hereinafter, a display panel will be described by taking an organic light-emitting display (OLED) as an example. However, display panels applicable to the present invention are not limited to liquid crystal panels, but may include liquid crystal panels (LCPs), plasma display panels (PDPs), or field emission display panels (FED panels).

Figure 2:
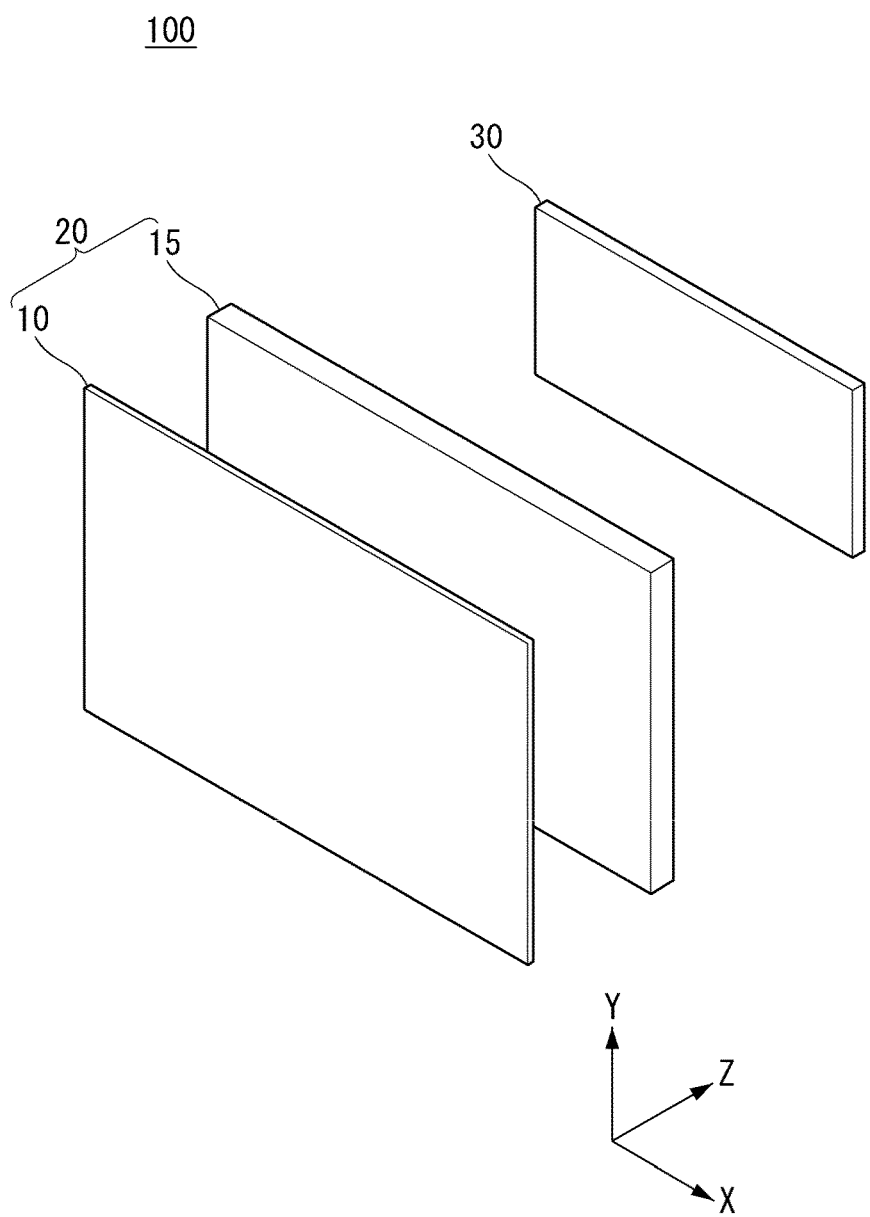
FIG. 2 is a view showing the configuration of a display device relating to the present invention.
Figure 3:
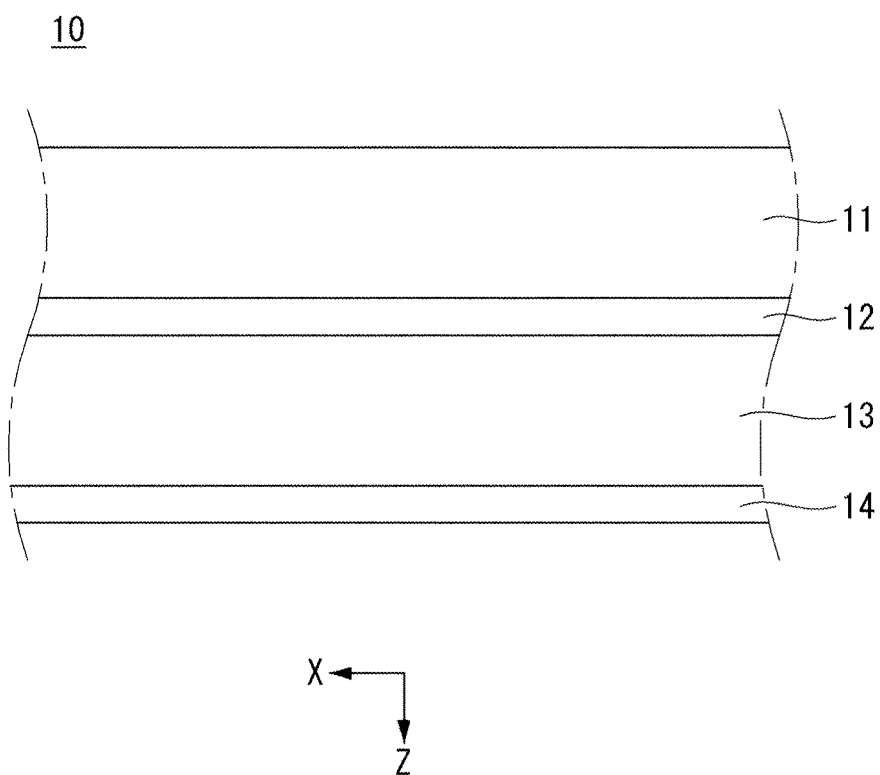
FIG. 3 is a view showing the configuration of a display panel relating to the present invention.

FIGS. 1 to 3 are views showing the configuration of a display device relating to the present invention.

As illustrated in FIG. 1, in what follows, a display panel 110 may include a first long side LS1, a second long side LS2 facing the first long side LS1, a first short side SS1 adjacent to the first long side LS1 and the second long side LS2, and a second short side SS2 facing the first short side SS1.

Here, the first short side SS1 may be referred to as a first side area, the second short side SS2 may be referred to as a second side area facing the first side area, the first long side LS1 may be referred to as a third side area adjacent to the first and second side areas and positioned between the first and second side areas, and the second long side LS2 may be referred to as a fourth side area adjacent to the first and second side areas, positioned between the first and second side areas, and facing the third side area.

For convenience of explanation, the first and second long sides LS1 and LS2 are longer in length than the first and second short sides SS1 and SS2; but, it should be noted that the first and second long sides LS1 and LS2 may be approximately the same length as the first and second short sides SS1 and SS2.

In what follows, a first direction DR1 may be parallel to the long sides LS1 and LS2 of the display panel, and a second direction DR2 may be parallel to the short sides SS1 and SS2 of the display panel 10.

A third direction DR3 may be perpendicular to the first direction DR1 and/or the second direction DR2.

The first direction DR1 and the second direction DR2 may be collectively referred to as a horizontal direction.

The third direction DR3 may be referred to as a vertical direction.

Referring to FIG. 2, the display device 100 according to the present invention may include a display portion 20 and a housing 30.

The display portion 20 may include a display panel 10 and a module cover 15. The display panel 10 may be provided on the front of the display device 100 and display an image. The display panel 10 may display an image by breaking an image down into pixels and controlling the color, brightness, and intensity of light emitted by each individual pixel. The display panel 10 may be divided into an active region where an image is displayed and an inactive region where no image is displayed.

The display panel 10 may be rectangular. However, the display panel 10 is not limited to such a shape and also may be shaped to have a predetermined curvature at the corners. The display panel 10 may be an organic light-emitting diode (OLED) panel. However, the display panel 10 is not limited to such a panel, but also may be a liquid crystal display panel.

The module cover 15 may be provided on the back of the display panel 10. The module cover 15 may be attached directly to the display panel 10. The module cover 15 may be the same size as or larger than the display panel 10.

The module cover 15 may support the back of the display panel 10. Accordingly, the module cover 15 may include a material that is lightweight and high in strength. For example, the module cover 15 may include aluminum.

The housing 30 may be provided on the back of the display portion 20. That is, the housing 30 may be provided on the back of the module cover 15. The housing 30 may shield at least one PCB. That is, the housing 30 may cover at least one PCB attached to the back of the module cover 15. A detailed structure of the at least one PCB and a method of attaching the same will be described below.

Electronic waves from the at least one PCB may be transmitted to the housing 30. Accordingly, the housing 30, though not shown, may be comprised of an inner housing made of conductive material and an outer housing covering the inner housing. However, the housing 30 is not limited to such a structure, and may be a single unit made of conductive material.

Referring to FIG. 3, the display panel 10 may include a transparent substrate 11, an upper electrode 12, an organic emissive layer 13, and a lower electrode 14. The transparent substrate 11, the upper electrode 12, the organic emissive layer 13, and the lower electrode 14 may be sequentially formed.

The transparent substrate 11 and the upper electrode 12 may include a transparent material. The lower electrode 14 may include a non-transparent material. However, the lower electrode 14 is not limited to such a material, but may include a transparent material (e.g., ITO). In this case, light may be emitted to one side of the lower electrode 14.

When a voltage is applied to the upper and lower electrodes 12 and 14, light emitted from the organic emissive layer 13 may exit through the upper electrode 12 and the transparent substrate 11. In this instance, a light shielding plate may be additionally provided behind the lower electrode 14, in order to direct light emitted from the lower electrode 14 forward.

The display device according to the present invention may be an OLED device. Thus, this display device requires no light source, and its volume and weight can be reduced. Also, the OLED display's response speed is 1,000 times or more that of liquid crystal displays, leaving no residual images when displaying images.

FIGS. 4 to 23 are views showing a display device according to an exemplary embodiment of the present invention.

Figure 4A:
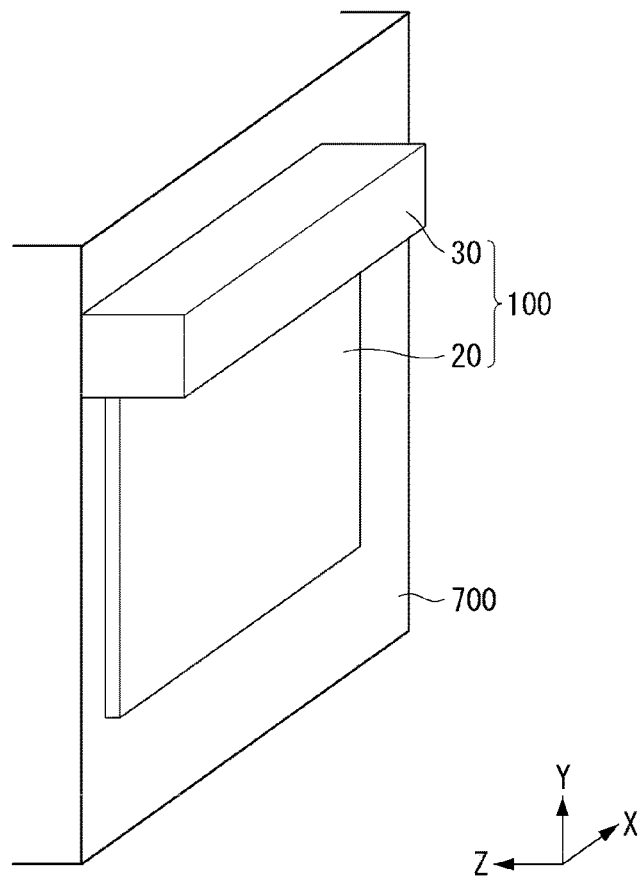
FIGS. 4(a) and 4(b) are views showing a display device according to an exemplary embodiment of the present invention.
Figure 4B:
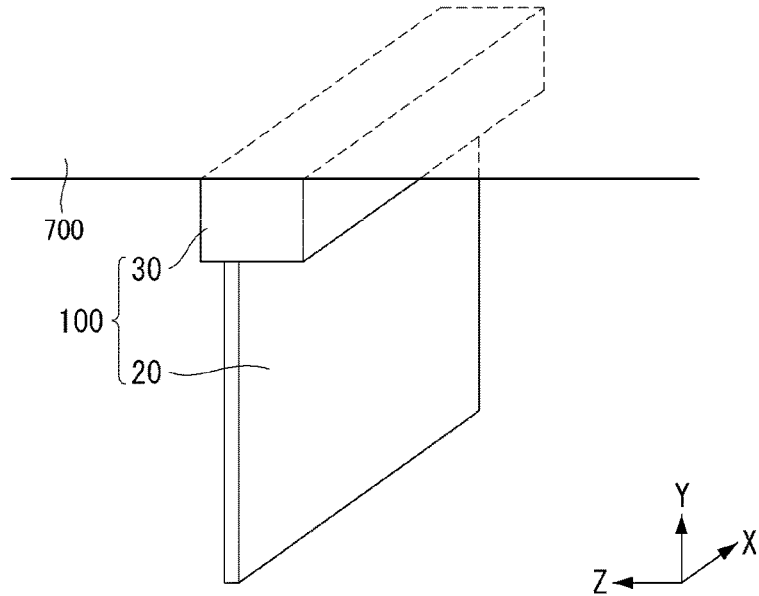

Referring to FIG. 4, in the display device 100 according to the present invention, the housing 30 may be positioned on top of the display portion 20. In more detail, the housing 30 may have a shape that covers the top of the display portion 20. The housing 30 may be configured not to expose drive equipment or drive circuits in it.

The widths of the housing 30 along the first and third directions may be larger than the width of the display portion 20, in order to protect the display portion 20 and the driving equipment within the housing 30.

As illustrated in (a) of FIG. 4, a side of the housing 30 may be attached to a target surface 700. The housing 30 may be attached to the target surface 700 with screws or an adhesive sheet. The height at which the housing 30 is attached to the target surface 700 may be greater than the width of the display portion 20 along the second direction. Accordingly, the display portion 20 would not touch the floor, allowing the user to immerse themselves into the display screen.

As illustrated in (b) of FIG. 4, the top of the housing 30 may be attached to the target surface 700. That is, the housing 30 may be attached to a ceiling. In this case, the display device may be attached to almost any location on the ceiling. Thus, the user can enjoy watching on the display screen more comfortably.

In the display device 100 according to the present invention, the housing 30 may not be positioned in the active region of the display portion 20. Accordingly, the display portion 20 may be made thinner, allowing the user to immerse themselves into the screen.

Referring to FIG. 5, in the display device 100 according to the present invention, the active region of the display portion 20 may be in a first state where the active region of the display portion 20 is within the housing 30 or a second state where the active region of the display portion 20 is exposed out of the housing 30.

When the display device 100 is in the first state, the active region of the display portion 20 may be within the housing 30. That is, the display portion 20 may be shielded in the housing 30.

When the display device 100 is in the second state, the active region of the display portion 20 may be exposed out of the housing 30. That is, when the display portion 20 is in the second state, at least part of the display portion 20 may stick out under the housing 30.

Although not shown, the display portion 20 may change from the first state to the second state by means of a roller within the housing 30. In more detail, when the roller unrolls, the display portion 20 may change from the first state in which it is kept wound around the roller to the second state in which it is exposed to the outside. In contrast, when the roller rolls back, the display portion 20 may change from the second state to the first state. A detailed structure of the roller and the display portion 20 and a method of operating them will be described later.

In the display device 100 according to the present invention, the display portion 20 may be either in the first state or in the second state. Accordingly, the user can save space by exposing the display portion 20 alone out of the housing 30 when viewing the display device 100.

Referring to FIG. 6, when the display portion 20 changes from the first state to the second state, the display portion 20 may stick out above the housing 30. That is, the housing 30 may be placed under the display portion 20.

With the housing 30 placed under the display portion 20, the housing 30 does not need to be attached to the target surface, allowing the user to carry the display device 100 around with ease.

Exemplary embodiments to be described later are illustrated by an example in which the display portion 20 sticks out under the housing 30, and they are not only limited to this example but also applicable to a case where the display portion 20 sticks out above the housing 30.

Figure 8:
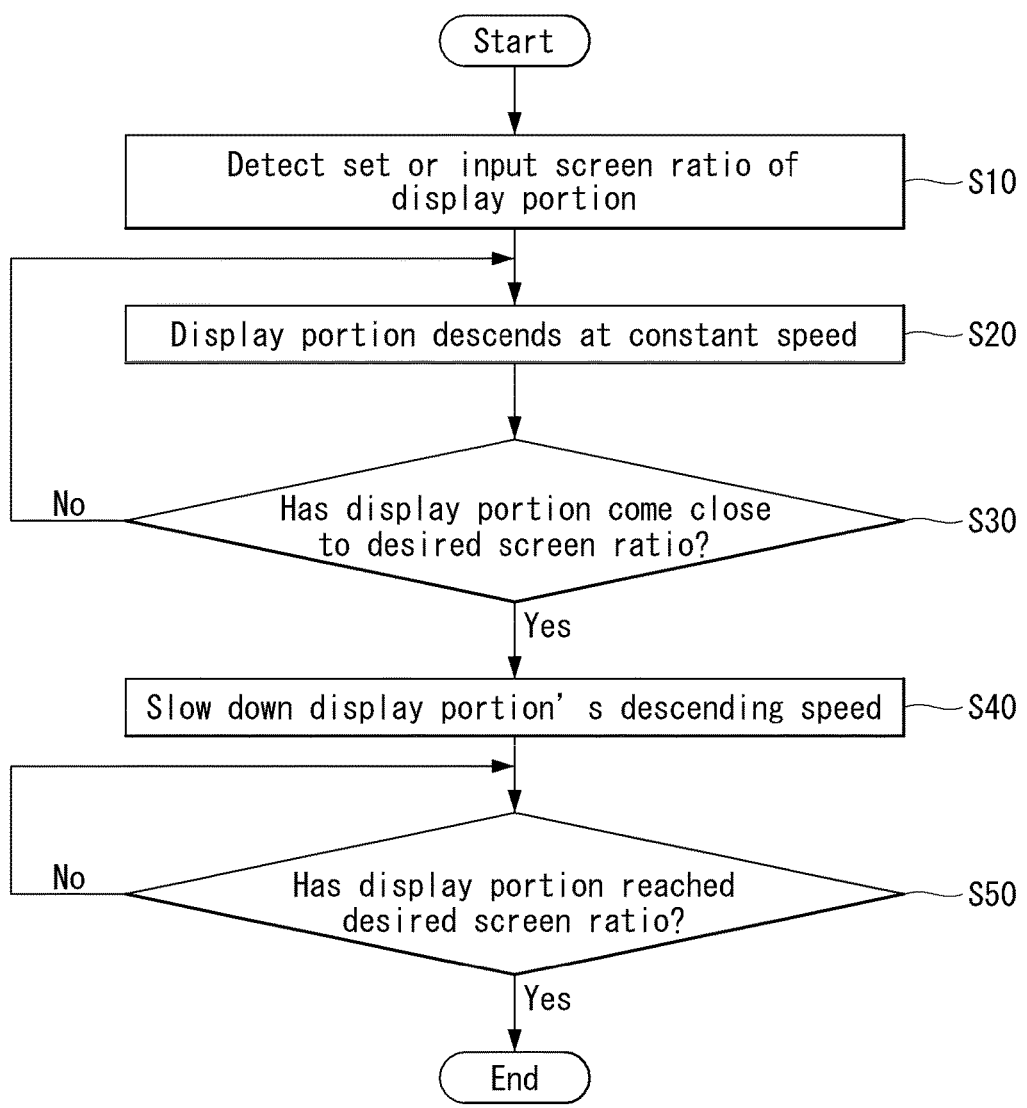
FIG. 8 shows an operation method of a display device by a controller according to an exemplary embodiment of the present invention.

Referring to FIGS. 7 and 8, in the display device according to the present invention, the speed at which the display portion 20 is exposed may vary during a transition from the first state to the second state.

For example, when the display portion 20 starts to be exposed out of the housing 30, the display portion 20 may descend at a first speed SP1. In contrast, the display portion 20 may descend at a second speed SP2 just before the display portion 20 reaches a desired screen ratio. The first speed SP1 may be faster than the second speed SP2. That is, the display portion 20's descending speed may be slowed down once it has come close to the desired screen ratio.

First of all, the display device may detect a set or input screen ratio for the display portion 20 (S10). The display device may include a controller. The controller may be operated to execute application programs or applications that run on the display device and data and instructions for operating the display device 100.

Normally, the controller controls the overall operation of the display device, as well as operations associated with the application programs. The controller may provide appropriate information or functions to the user or deal with them by processing signals, data, information, etc. input or output through the aforementioned elements or by running application programs stored in memory.

Specifically, the controller of the display device may detect a set or input screen ratio for the display portion 20. In an example, the set screen ratio may be a screen ratio the user input previously. In another example, the set screen ratio may be a screen ratio just before the display device is powered off. If there is no preset screen ratio, the controller may receive input of a desired screen ratio from the user.

The controller may allow the display portion 20 to descend at a constant speed upon detecting a set or input screen ratio for the display portion 20 (S20). The display portion 20 may descend at a first speed SP1. The controller may enable the display portion 20 to maintain a constant descending speed by keeping the amount of rotation of a motor constant.

The controller may detect whether the display portion 20 has come close to a desired screen ratio (S30). For example, the controller may detect by an encoder whether the display portion 20 has almost reached a given screen ratio. If the display portion 20 has not yet come close to the desired screen ratio, the controller may send a control signal to enable the display portion 20 to keep descending at a given speed. On the other hand, if the display portion 20 has come close to the desired screen ratio, the controller may slow down the display portion 20's descending speed (S40). In this case, the display portion 20's descending speed may be a second speed SP2, which is slower than the first speed SP1.

When the display portion 20 is descending at the second speed SP2, the controller may detect whether the display portion 20 has reached the desired screen ratio (S50). For example, the controller may detect by an encoder whether the display portion 20 has reached the desired screen ratio. If the display portion 20 has not yet reached the desired screen ratio, the controller may send a control signal to enable the display portion 20 to keep descending at the second speed SP2. On the other hand, if the display portion 20 has reached the desired screen ratio, the controller may send a control signal to enable the display portion 20 to stop descending.

In the display device according to the present invention, the display portion 20's descending speed may be slowed down just before it reaches the desired screen ratio. This will reduce the risk of a drive unit failure that can happen when the display portion 20 abruptly stops descending.

Figure 9:
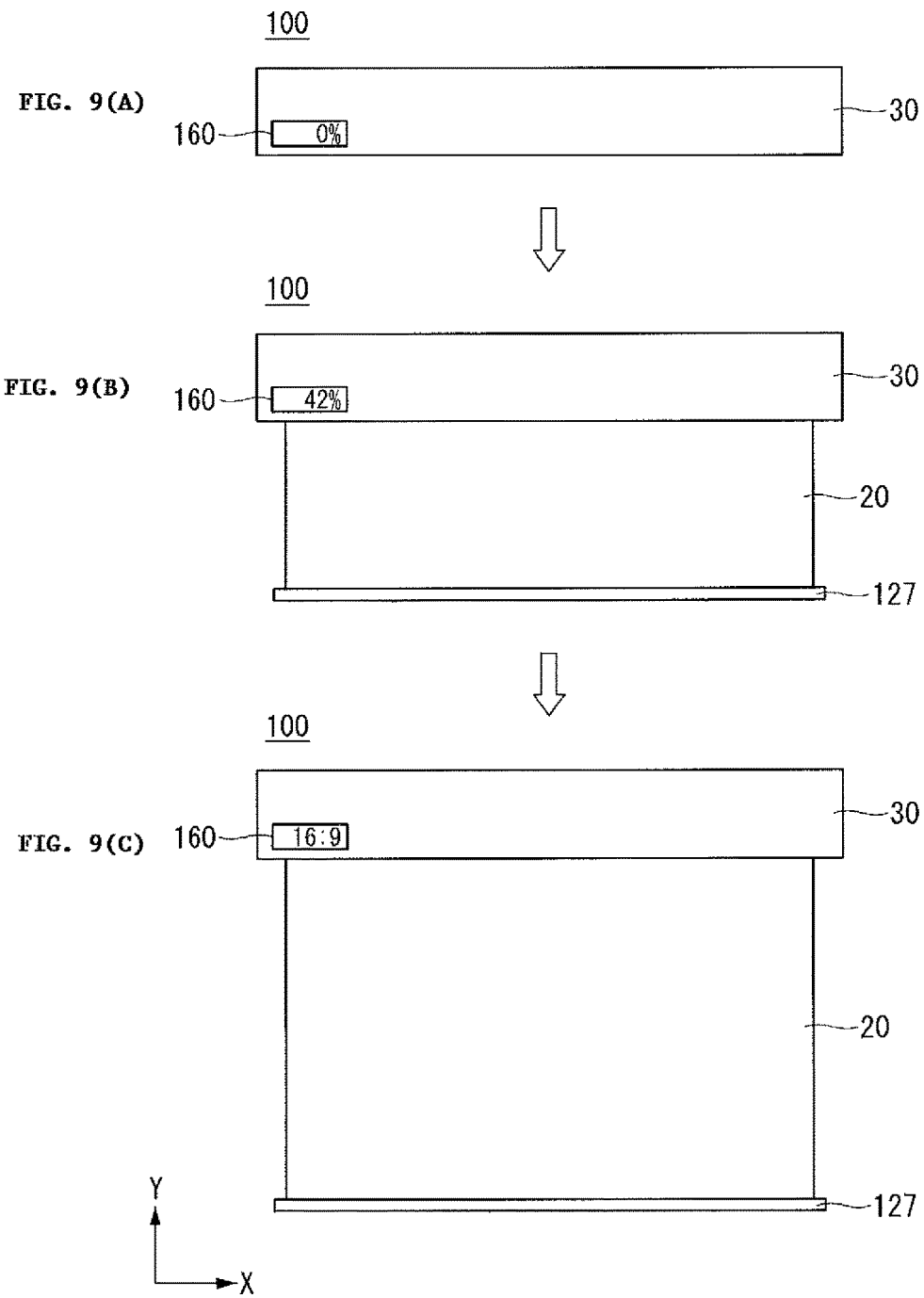
FIGS. 9(a), 9(b), and 9(c) are views showing a display device according to an exemplary embodiment of the present invention.

Referring to FIG. 9, in the display device according to the present invention, an indicator 160 may be located at a corner of the front of the housing 30. The indicator 160 may show the condition of the display portion 20. Specifically, the indicator 160 may show the extent of exposure of the display portion 20.

The indicator 160 may show the percentage of the set or input screen ratio to the current screen ratio for the display portion 20. For example, in the first state, the display portion 20 may not be exposed out of the housing 30. Thus, the controller may send a control signal to enable the indicator 160 to show 0%.

As the display portion 20 changes from the first state to the second state, the length of exposure of the display portion 20 from the housing 30 may increase. In this case, the indicator 160 may keep showing the percentage of exposed area of the display portion 20. For example, the controller may send a control signal to enable the indicator 160 to show the percentage gradually increasing from 0% to 100%.

When the display portion 20 is in the second state, the controller may send a control signal to enable the indicator 160 to show the final screen ratio. For example, a ratio of 16:9 may be shown in the indicator 160. However, the final screen ratio is not limited to this value, but the indicator 160 may show 100%, which means that the set or input screen ratio is reached.

In the display device according to the present invention, the indicator 160 may show the extent of exposure of the display portion 20 from the housing 30. Accordingly, the user may be able to predict when the display portion 20 will reach the second state and to check whether the display portion 20 is operating properly.

Figure 10:
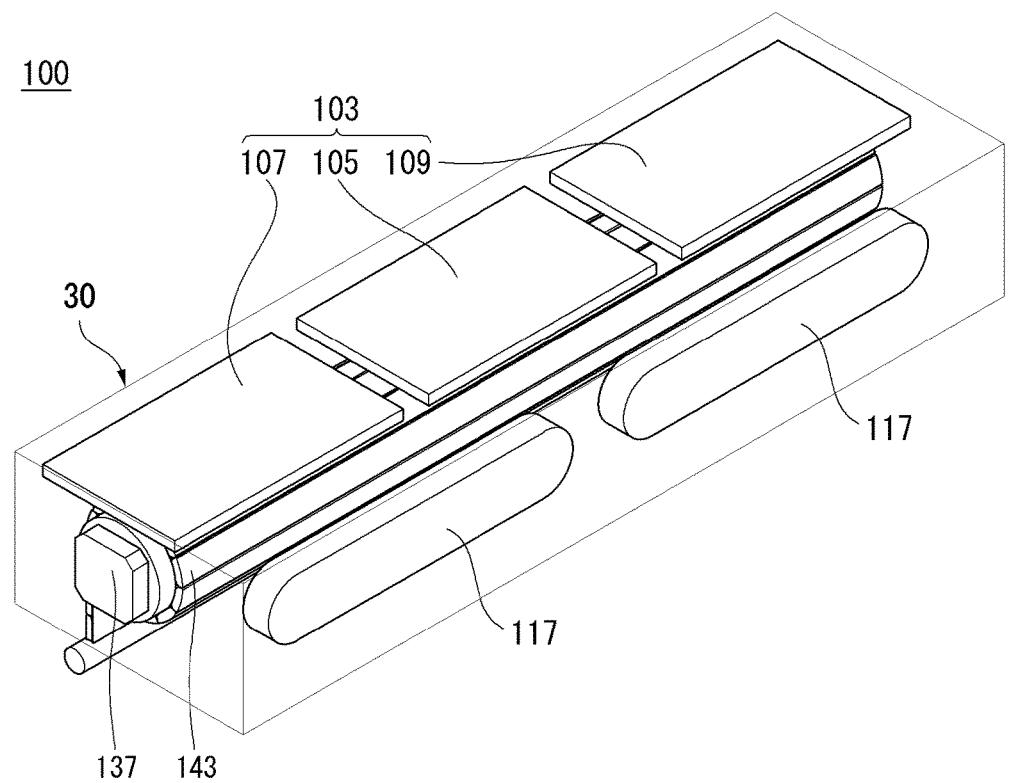
FIG. 10 is a view showing an inside of a display device according to an exemplary embodiment of the present invention.

Referring to FIG. 10, the display device 100 according to the present invention may include, inside the housing 30, a panel roller 143, a speaker 117, at least one PCB (printed circuit board), and a motor 137, The panel roller 143 may be positioned on one side of the interior of the housing 30. The panel roller 143 may be positioned off-center in the housing 30 and more to the second direction. Accordingly, space for other structures may be provided on the opposite side of the panel roller 143. The panel roller 143 may either wind or unwind the display portion in order to bring it to either the first state or the second state.

The speaker 117 may be positioned on the other side of the interior of the housing 30. The speaker 117 may be positioned on the opposite side of the panel roller 143 along the first direction. For example, the speaker 117 may be positioned on both sides of the front of the housing 30. The speaker 117 may produce sound and deliver it to the user. Accordingly, it will be more efficient if the speaker 11 is positioned on the front of the housing 30.

At least one PCB 103 may be positioned on the top of the housing 30. Each PCB may be spaced apart from one another.

For example, the at least one PCB may be a main board 109. The main board 109 may provide an interface for operating the display device. Also, the main board 109 may check and control the operating conditions of the parts in the display device to make them the best they can be.

In another example, the at least one PCB may be a power supply 107. The power supply 107 may supply electric power to the display device. That is, the power supply 107 may supply electric power to the body. The power supply 107 may convert an AC frequency into a DC frequency. That is, the power supply 107 may convert a low frequency into a high frequency, which may result in higher electric efficiency.

In still another example, the at least one PCB may be a timing controller board 105. The timing controller board 105 may deliver input signals to the display panel. That is, the timing controller board 105 may deliver timing signals CLK, LOAD, and SPi for controlling a source PCB and video signals R, G, and B to the source PCB. Also, the timing controller board 105 may control images. The timing controller board 105 may be connected to the source PCB via either FFC, round cable, or wireless transmission.

The at least one PCB 103 may be positioned on the top of the panel roller 143, spaced apart from one another. Thus, the at least one PCB 103 does not come into contact with the display portion when the display portion is being wound, thereby ensuring safe operation.

A motor 137 may be positioned on one end of the rotational axis of the panel roller 143. The motor 137 may provide energy for the panel roller 143 to rotate. The motor 137 may receive an electrical signal and convert it into physical energy. While the motor 137 is depicted as being positioned on one end of the rotational axis of the panel roller 143, the motor is not limited to such a configuration but may be positioned on two opposite ends of the rotational axis of the panel roller 143.

The display device 100 according to the present invention may be shaped in such a manner that other structures cover the panel roller 143. This can save space, leading to a reduction in the size of the housing 30.

Figure 11:
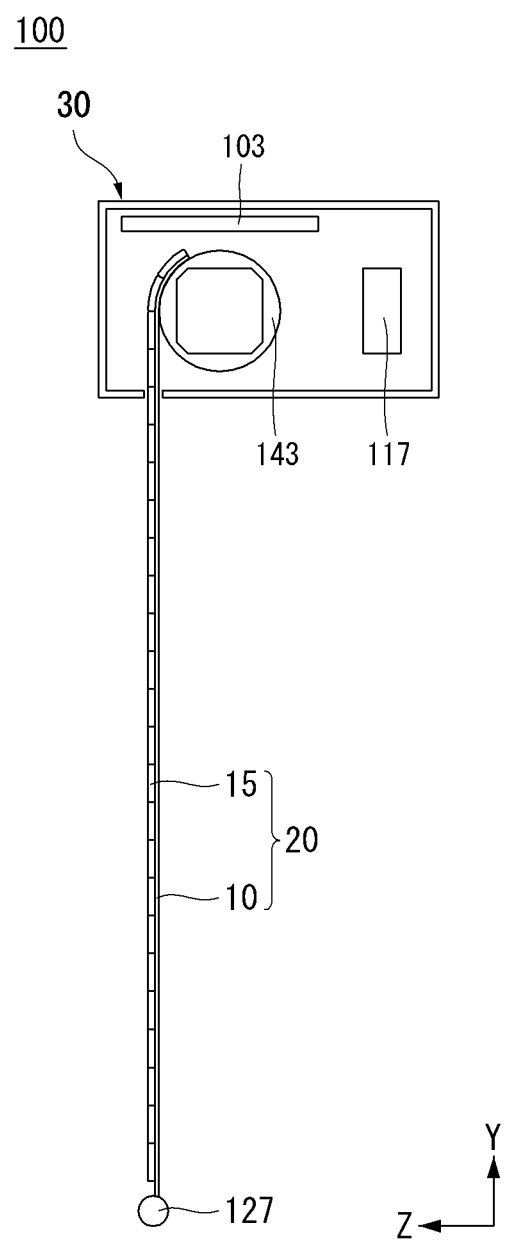
FIG. 11 is a view showing a display device according to an exemplary embodiment of the present invention.

Referring to FIG. 11, in the display device 100 according to the present invention, the module cover 15 and the display panel 10 may be wound together around the panel roller 143.

Accordingly, more space can be saved, compared to when the module cover 15 and the display panel 10 are wound around different rollers. Also, since the module cover 15 and the display panel 10 are wound simultaneously, no structure may be required to bring the module cover 15 and the display panel 10 into contact with each other.

A bottom bar 127 may be positioned on one end of the display portion 20. The bottom bar 127 may have the shape of a cylinder that is connected to one end of the display portion 20. The bottom bar 127 may be extended in the first direction. The bottom bar 127 may include a material with a high density. For example, the bottom bar 127 may include a metallic material. Accordingly, the display portion 20 may remain flat due to the force of gravity generated by the weight of the bottom bar 127.

Figure 12A:
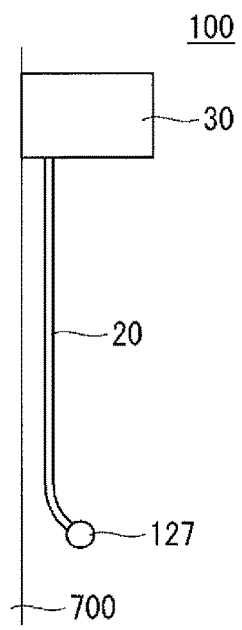
FIGS. 12(a), 12(b), and 12(c) are views showing a display device according to an exemplary embodiment of the present invention.
Figure 12B:
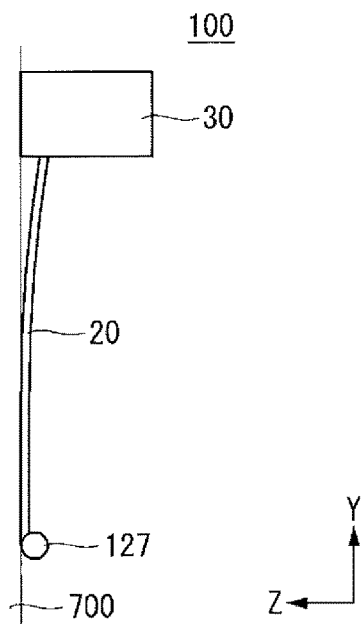
Figure 12C:
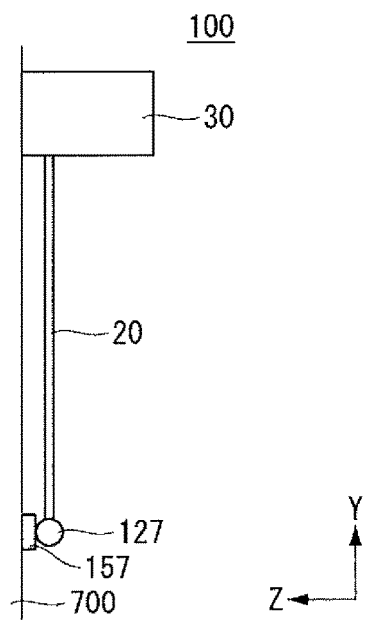

Referring to FIG. 12, even after the display portion 20 wound around the roller within the housing 30 is moved to the second state, one end of the display portion 20 may still remain bent to one side, as illustrated in (a) of FIG. 12. That is, the display portion 20 may not be fully unwound. Also, since the display portion 20 attaches itself firmly to the target surface 700, one end of the display portion 20 may be bent. This can make it difficult for the user to immerse themselves into the display screen.

On the other hand, as illustrated in (b) of FIG. 12, the bottom bar 127 may include a magnetic material. In the second state, the bottom bar 127 may be magnetically attached to a joint part 157 attached to the target surface 700. Accordingly, the display portion 20 may come into contact with the target surface 700 and therefore be kept from being bent. Also, the joint part 157 may attract the bottom bar 127 by magnetism. Thus, the display portion 20 may be kept from returning to the bent shape. That is, the display portion 20 may remain flat.

Figure 13:
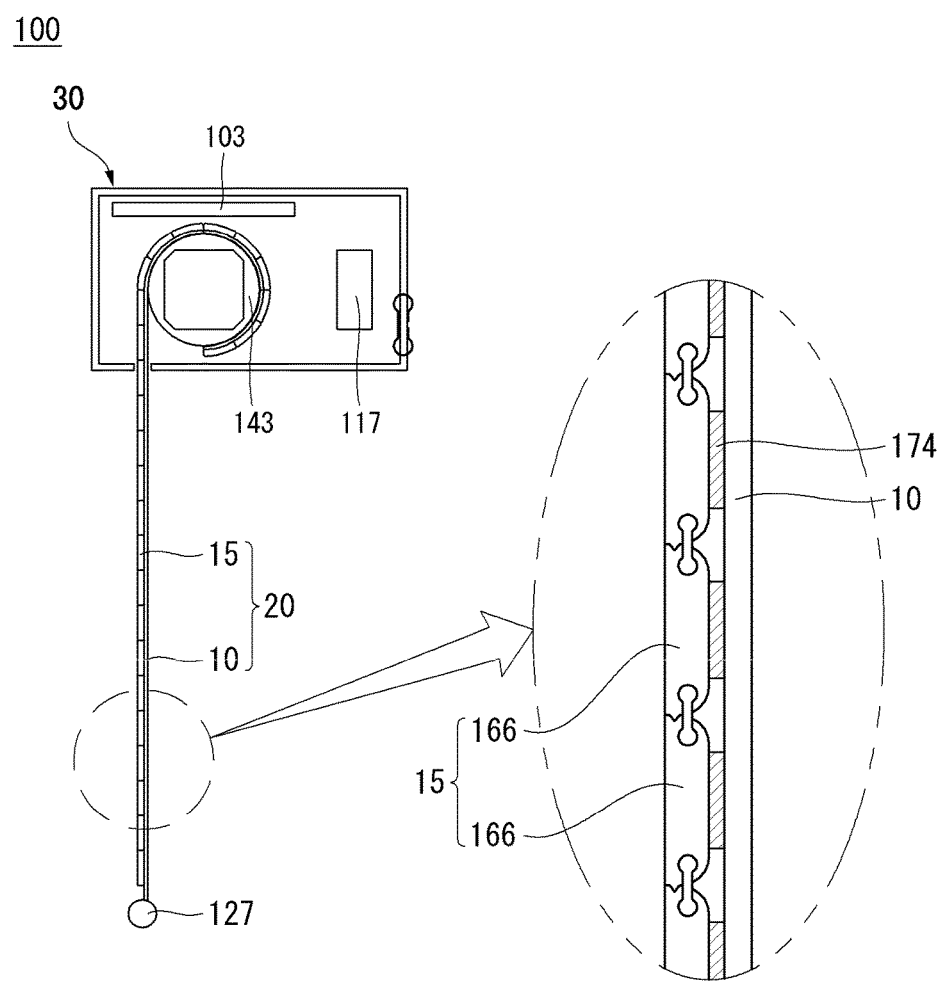
FIG. 13 is a view showing a display device according to an exemplary embodiment of the present invention.

Referring to FIG. 13, the module cover 15 may include a plurality of aprons 166, at least some of which are joined to one another. The aprons 166 may be joined to one another at least in part. As such, the shape of the module cover 15 may deform easily when it is wound around or unwound from the roller. The module cover 15 may include a plastic or aluminum material. Accordingly, the module cover 15 may protect the display panel 10 from external impact.

The display panel 10 and the module cover 15 may be held together by an adhesion layer 174. The adhesion layer 174 may be double-sided tape. Using the adhesion layer 174, the module cover 15 may be wound or unwound along with the display panel 10. The adhesion layer 174 may be positioned on the aprons 166 and adhere to the display panel 10. Each segment of the adhesion layer 174 may be set apart from each other. Accordingly, the shape of the module cover 15 may deform easily when it is wound around or unwound from the roller. The smaller the width of the adhesion layer 174 along the second direction, the less the display panel 10 will deform on external force. In more detail, the smaller the width of the adhesion layer 174 along the second direction, the more flexible it can be, thus transmitting less external force to the display panel 10.

Moreover, the larger the width of the aprons 166 along the second direction, the less likely the display panel 10 will have cracks. In more detail, the larger the width of the aprons 166 along the second direction, the higher the rigidity; thus, no cracks will appear in the display panel 10.

Therefore, if the width of the adhesion layer 174 along the second direction is no more than 30% of the width of the aprons 166 along the second direction, less external force is transmitted to the display panel 10, and this may lead to less bumps on the display screen.

Also, if the width of the adhesion layer 174 along the second direction is no less than 15% of the width of the aprons 166 along the second direction, the rigidity of the display panel 10 is improved, and this may lead to less cracks in the display panel 10.

Moreover, the larger the width of the adhesion layer 174 along the third direction, the less the display panel 10 will deform on external force. In more detail, the larger the width of the adhesion layer 174 along the third direction, the more flexible it can be, thus transmitting less external force to the display panel 10.

In addition, the smaller the width of the aprons 166 along the third direction, the less likely the display panel 10 will have cracks. In more detail, the larger the width of the aprons 166 along the third direction, the higher the rigidity; thus, no cracks will appear in the display panel 10.

Therefore, if the width of the adhesion layer 174 along the third direction is no less than 3% of the width of the aprons 166 along the third direction, less external force is transmitted to the display panel 10, and this may lead to less bumps on the display screen.

Also, if the width of the adhesion layer 174 along the third direction is no more than 6% of the width of the aprons along the third direction, the rigidity of the display panel 10 is improved, and this may lead to less cracks in the display panel 10.

In the display device according to the present invention, the module cover 15 may include a plurality of aprons 166, and the adhesion layer 174 may be positioned on the aprons 166. Accordingly, the shape of the module cover may deform more easily when it is wound around the roller, compared to when the module cover 15 is configured as a single unit.

Figure 14:
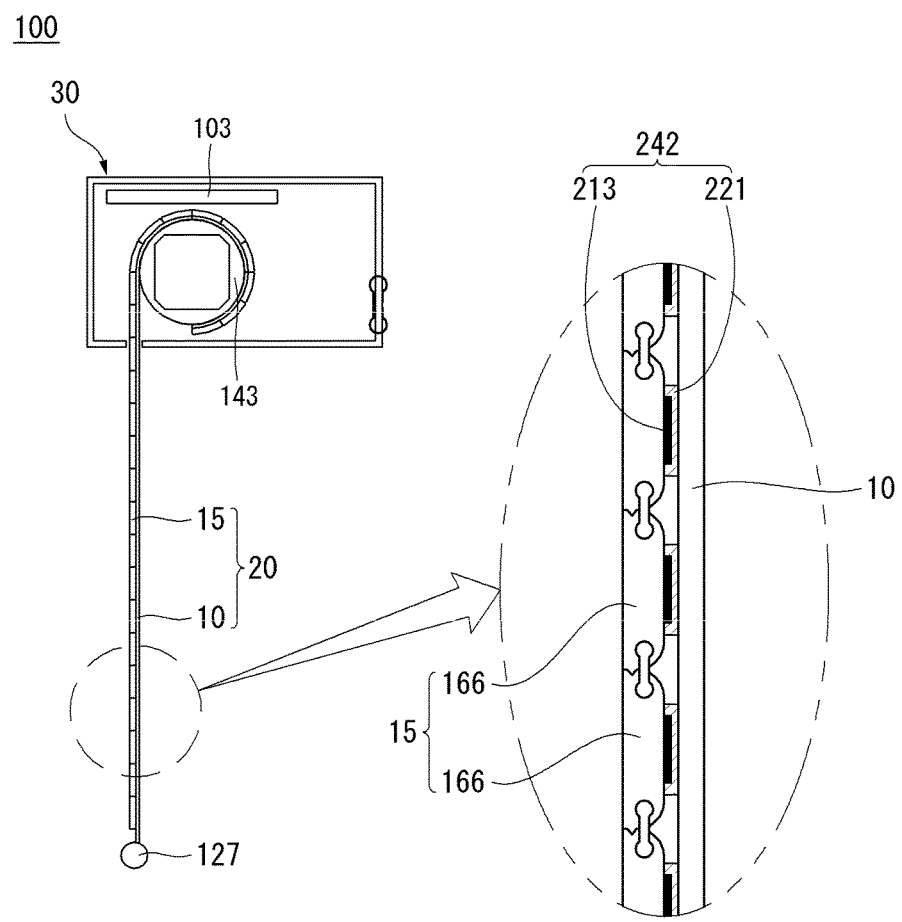
FIG. 14 is a view showing a display device according to an exemplary embodiment of the present invention.

Referring to FIG. 14, in the display device according to the present invention, the module cover 15 and the display panel 10 may be attached by at least one speaker connecting portion 242. The speaker connecting portion 242 may be positioned on the aprons 166, respectively.

In this case, the aforementioned speaker (117 of FIG. 11) may not be positioned on the front of the interior of the housing 30. However, the speaker (117 of FIG. 11) is not limited to this, but may deliver sound to the user like the speaker connecting portion 242 does.

The at least one speaker connecting portion 242 may include shakers 213 and transmitting portions 221. The shakers 213 may be positioned on the aprons 166, respectively. The shakers 213 may transmit a vibration corresponding to an acoustic wave by using the piezoelectric effect.

The transmitting portions 221 may be shaped to shield the shakers 213. The transmitting portions 221 may include a magnetic material. Also, the transmitting portions 221 may include a flexible material. For example, the transmitting portions 221 may include, at least in part, rubber, synthetic resin, or polymer. The transmitting portions 221 may be positioned on the aprons 166, respectively, so that the aprons 166 are attached to the display panel 10 by magnetism.

In the display device according to the present invention, sound may be radiated to the front of the display panel 100 by utilizing the vibration on the display panel 10 transmitted from the shakers 213. Since the transmitting portions 221 are attached to the display panel by magnetism, the vibration may be effectively transmitted.

Figure 15A:
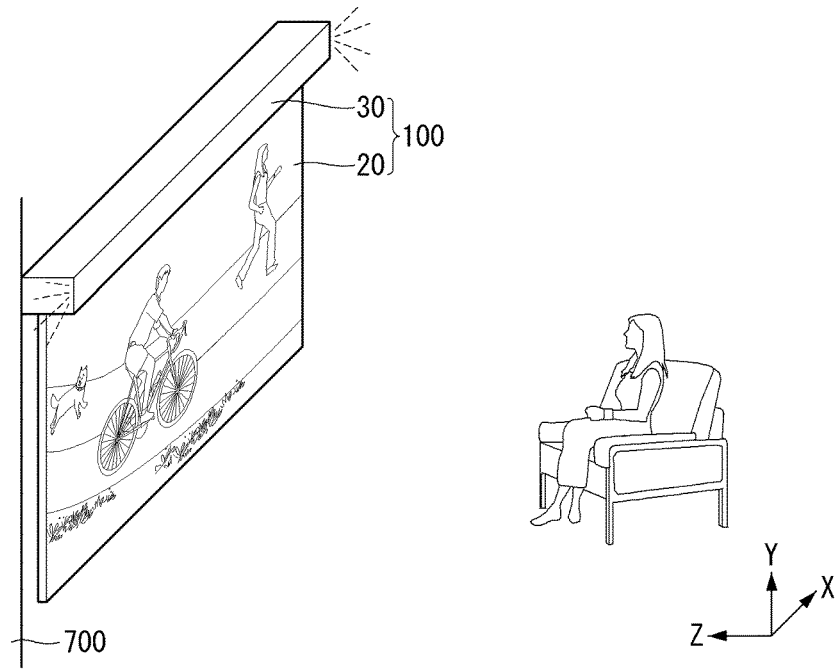
FIGS. 15(a) and 15(b) are views showing a display device according to an exemplary embodiment of the present invention.
Figure 15B:
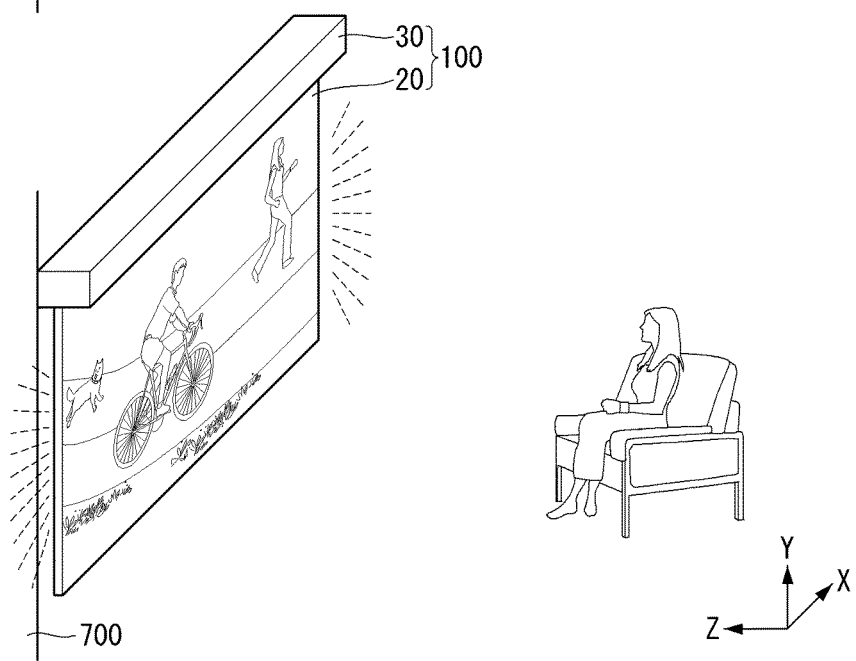

Referring to FIG. 15, as illustrated in (a) of FIG. 15, if the speaker is positioned within the housing 30, this means that the display screen and a sound emitting portion may be at different locations. This may make it difficult for the user to immerse themselves into the screen because audio information and video information come from different locations.

On the other hand, as illustrated in (b) of FIG. 15, if the speaker is positioned within the display portion 20, this means that the display screen and the sound emitting portion may be at the same location. This may make it easier for the user to immerse themselves into the screen because audio information and video information come from the same location.

Figure 16:
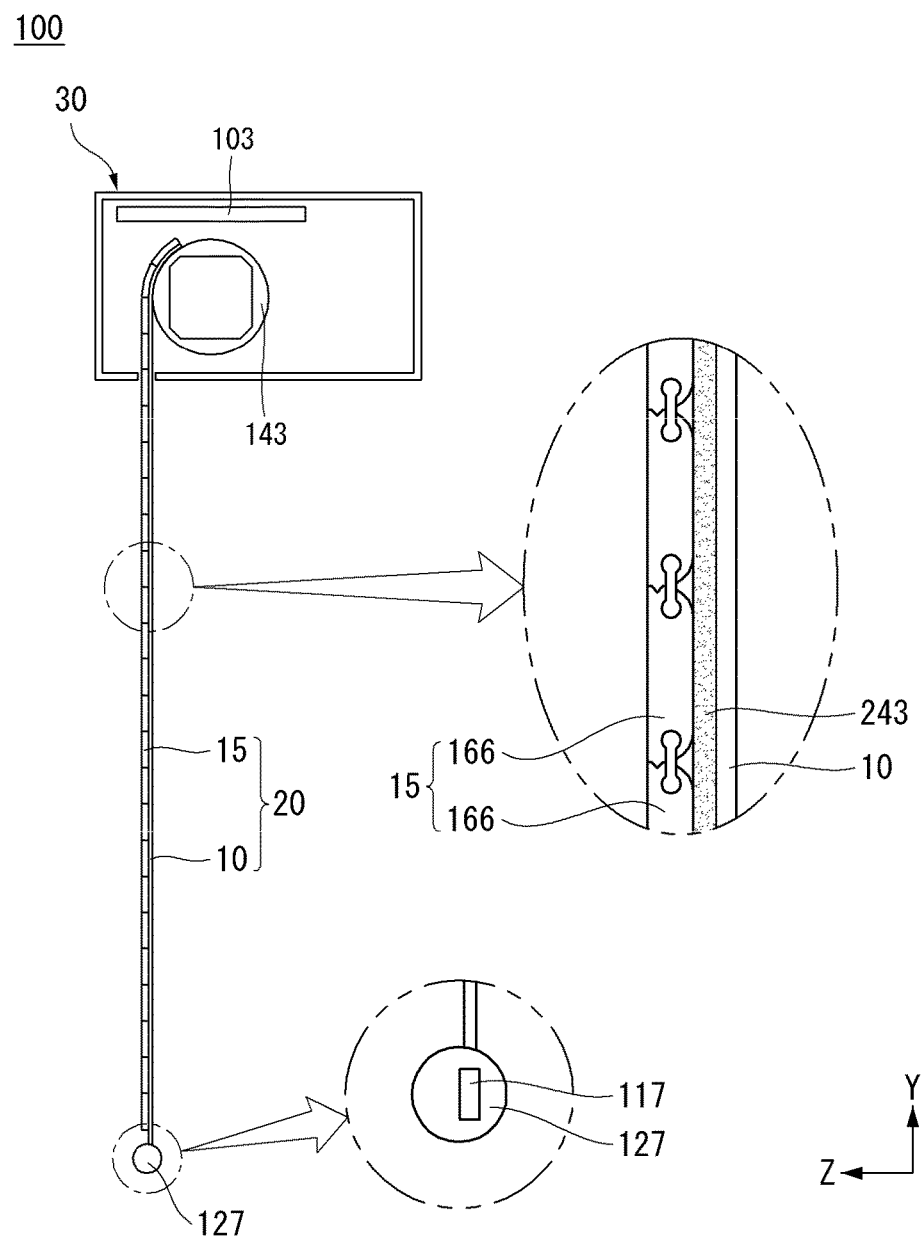
FIG. 16 is a view showing a display device according to an exemplary embodiment of the present invention.

Referring to FIG. 16, in the display device according to the present invention, the speaker 117 may be positioned within the bottom bar 127. The speaker 117 may be positioned within the bottom bar 127 in such a manner that radiates sound forward. In this case, when an image is displayed on the lower end of the display portion 20 as the display portion 20 is unwound from the panel roller 143, the display screen and the sound emitting portion may be adjacent to each other. This may make it easier for the user to immerse themselves into the screen because audio information and video information come from the same location.

With the speaker 117 positioned within the bottom bar 127, the speaker 17 may be connected to a drive part within the housing 30 by an electric wire 243. The electric wire 243 may electrically connect the speaker 117 and the drive part. The electric wire 243 may be positioned between the aprons 166 and the display panel 10. The aforementioned adhesion layer 174 may not be positioned where the electric wire 243 is positioned. That is, the adhesion layer 174 may be removed in order to ensure a space for the electric wire 243. The electric wire 243 may be connected to the drive part within the housing 30 through the space between the display panel 10 and the aprons 166. Accordingly, the electric wire 243 may not be exposed. As such, the user may be able to immerse themselves into the display screen with ease.

Figure 17A:
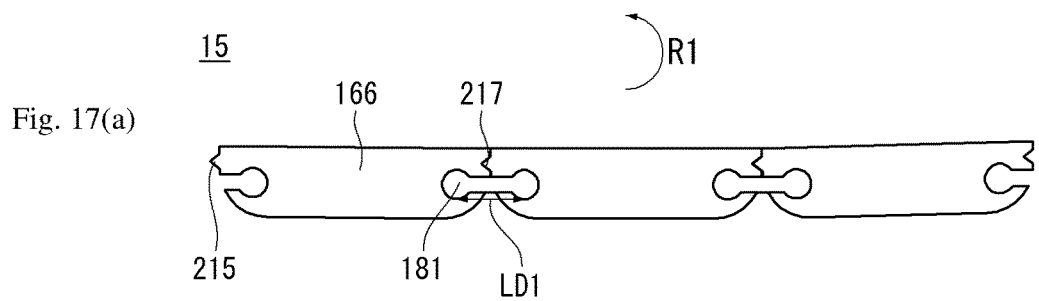
FIGS. 17(a) and 17(b) are views showing aprons, protuberances, and depressed parts according to an exemplary embodiment of the present invention.
Figure 17B:
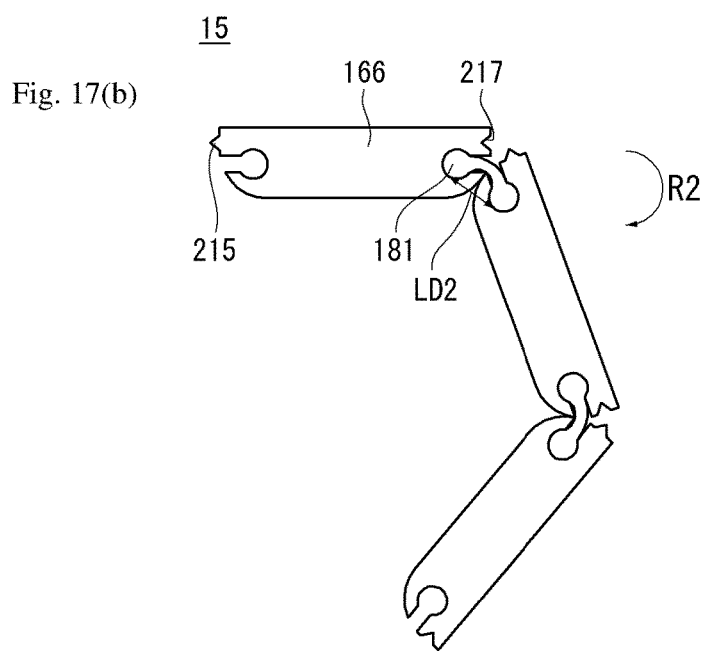

Referring to FIG. 17, in the display device according to the present invention, the aprons 166 each may include a protuberance 215 and a depressed part 217. The protuberance 215 may be positioned on one of the sides of the apron 166 contacting other aprons 166, and the depressed part 217 may be positioned on the side opposite to the protuberance 215.

The protuberance 215 and the depressed part 217 may engage each other. In the second state, the protuberance 215 of at least one apron 166 may be inserted into the depressed part 217 of an adjacent apron 166.

The at least one apron 166 may be connected to an adjacent apron 166 by a link 181. One end of the link 181 may be positioned below the protuberance 215 of the at least one apron 166. The other end of the link 181 may be positioned below the depressed part 217 of the adjacent apron 166. The link 181 may include a high-tensile material. Thus, the link 181 may be hard to stretch.

As illustrated in (a) of FIG. 17, a certain torque may be applied to the module cover 15 in a first direction R1. For example, the first direction may be a counterclockwise direction. As the aprons 166 move counterclockwise, the protuberances 217 may be detached from the depressed parts 215. As the aprons 166 move counterclockwise, the distance between the lower parts of each two adjacent aprons 166 may decrease. However, the links 181 positioned on the lower parts of the aprons 166 may be stretched no more than a first length LD1. Accordingly, the links 181 may prevent the aprons 166 from moving counterclockwise.

On the other hand, as illustrated in (b) of FIG. 17, a certain torque may be applied to the module cover 15 in a second direction R2. The second direction may be the opposite direction of the first direction. That is, the second direction may be a clockwise direction. As the aprons 166 move clockwise, the protuberances 217 may be detached from the depressed parts 215. As the aprons 166 move clockwise, the distance between the lower parts of each two adjacent aprons 166 may decrease. Accordingly, the distance between two opposite ends of the links 181 positioned on the lower parts of the aprons 166 may decrease from the first length LD1 to a second length LD2. In this case, as the links 181 bend in the second direction, they may correspond to the decrease in distance. The links 181 may not obstruct the aprons 166 from moving clockwise.

In the display device according to the present invention, the module cover 15 may bend in the first direction but not in the second direction. Accordingly, the module cover 15 may be easily wound around the panel roller 143, and remain flat in the second state.

Figure 18A:
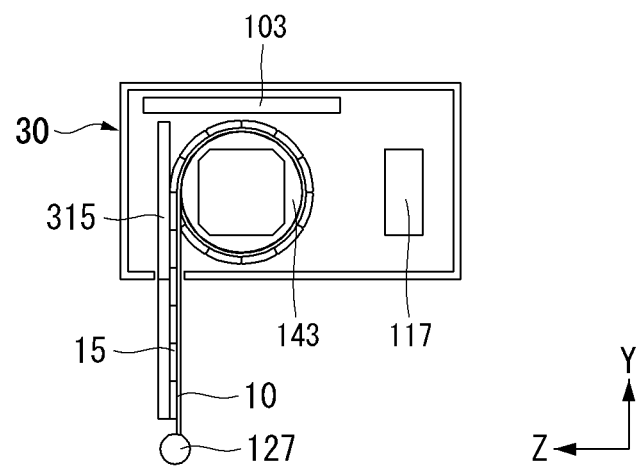
FIGS. 18(a) and 18(b) are views showing a display device according to an exemplary embodiment of the present invention.
Figure 18B:
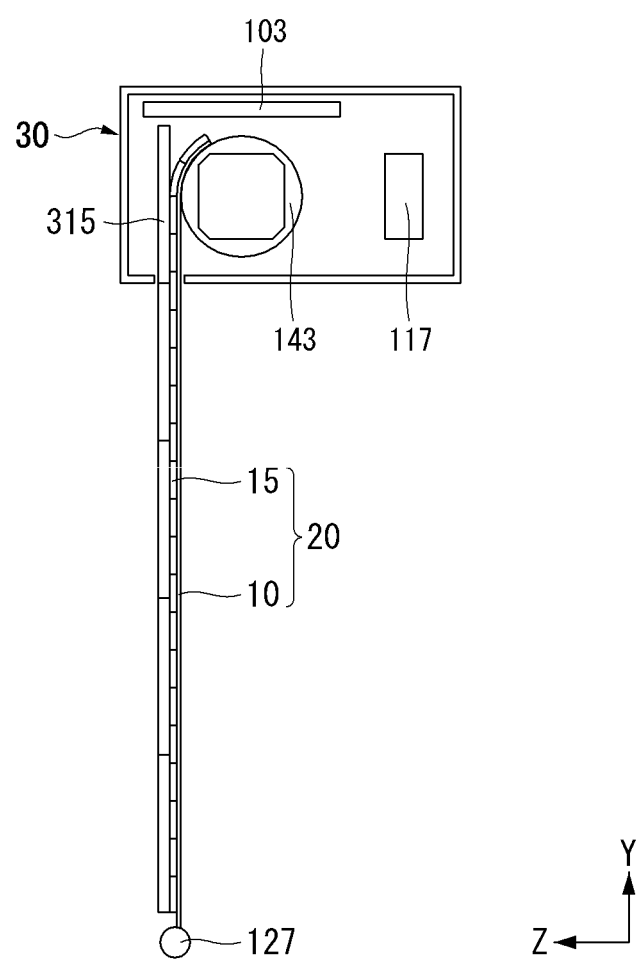

Referring to FIG. 18, in the display device according to the present invention, a telescopic bar 315 may be positioned where the module cover 15 is wound. For example, the telescopic bar 315 may be positioned at the back of the panel roller 143, which is the opposite side of the speaker 117. The telescopic bar 315 may support the display portion 20 from the back of the display portion 20. The telescopic bar 315 may be stretched as the display portion 20 is wound from the panel roller 143. That is, the telescopic bar 315 may move simultaneously with the display portion 20.

One end of the telescopic bar 315 may be fixed to the interior of the housing 30, while the other end may be fixed to the tip of the module cover 15. Other than these two fixed parts, the telescopic bar 315 may be freely stretched or contracted. Accordingly, the telescopic bar 315 may support the display portion 20 under any condition.

Figure 19:
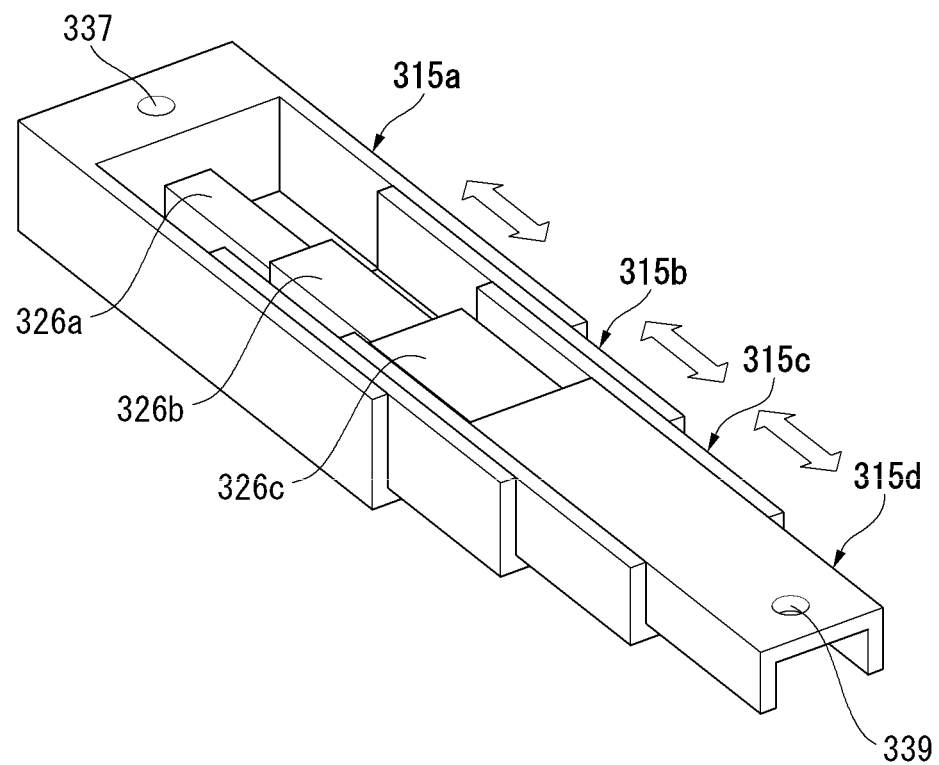
FIG. 19 is a view showing a telescopic bar according to an exemplary embodiment of the present invention.

Referring to FIG. 19, the telescopic bar 315 may include first to four bars 315a to 315d. The top sides of the first to fourth bars 315a to 315d may be at the same height. That is, the sides of the first to fourth bars 315a to 315d that make contact with the module cover may be the same height. The second to fourth bars 315b to 315d may be sequentially inserted into the first bar 315a. Specifically, a second guide rail 326b of the second guide bar 315b may be fitted over a first guide rail 326a projecting at the center of the first bar 315a, a third guide rail 326c of the third bar 315c may be fitted over the second guide rail 326b, and a projection of the fourth bar 315d may be fitted along both sides of the third guide rail 326c. As the second to fourth bars 315b to 315d move on the first to third guide rails 326c to 326c, the telescopic bar 315 may be stretched or contracted.

A first hole 337 may be positioned in the top part of the first bar 315a. The telescopic bar 315 may be fixed to the interior of the housing via the first hole 337. The telescopic bar 315 may be attached with a screw to the housing via the first hole 337. However, the telescopic bar 315 is not limited to such a configuration, but may be attached to the housing with a hook or an adhesive sheet.

A second hole 339 may be positioned in the bottom part of the fourth bar 315d. The telescopic bar 315 may be fixed to the bottom end of the module cover via the second hole 339. The telescopic bar 315 may be attached with a screw to the bottom end of the module cover via the second hole 339. However, the telescopic bar 315 is not limited to such a configuration, but may be attached to the module cover with a hook or an adhesive sheet.

Figure 20:
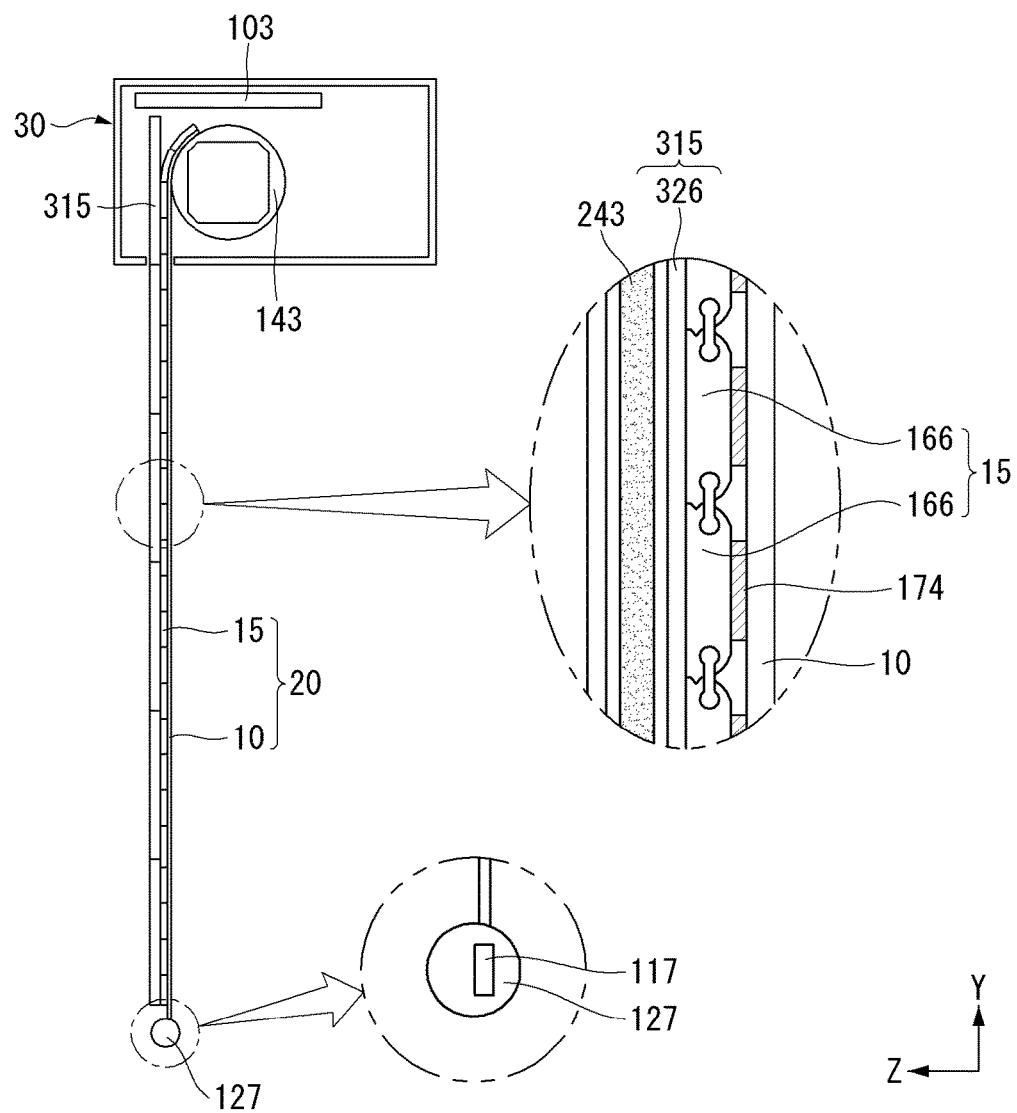
FIG. 20 is a view showing a display device according to an exemplary embodiment of the present invention.

Referring to FIG. 20, in the display device according to the present invention, the speaker 117 may be positioned within the bottom bar 127. The speaker 117 may be positioned within the bottom bar 127 in such a manner that radiates sound forward. In this case, when an image is displayed on the lower end of the display portion 20 as the display portion 20 is unwound from the panel roller 143, the display screen and the sound emitting portion may be adjacent to each other. This may make it easier for the user to immerse themselves into the screen because audio information and video information come from the same location.

With the speaker 117 positioned within the bottom bar 127, the speaker 17 may be connected to a drive part within the housing 30 by an electric wire 243. The electric wire 243 may electrically connect the speaker 117 and the drive part. The electric wire 243 may be inserted into the telescopic bar 315. The electric wire 243 may be inserted into the guide rail 326 of the telescopic bar 315. The electric wire 243 may be inserted onto the side opposite to where the first to fourth bars (315a to 315d of FIG. 19) move on the guide rail 326.

In this case, the electric wire 243 may not be exposed. This may make it easier for the user to immerse themselves into the display screen. Moreover, no space for the electric wire 243 may be required between the display panel 10 and the aprons 166. Accordingly, the adhesion layer 174 may be positioned on all parts of the aprons 166. As such, the module cover 15 and the display panel 10 may not be easily detached.

Figure 21A:
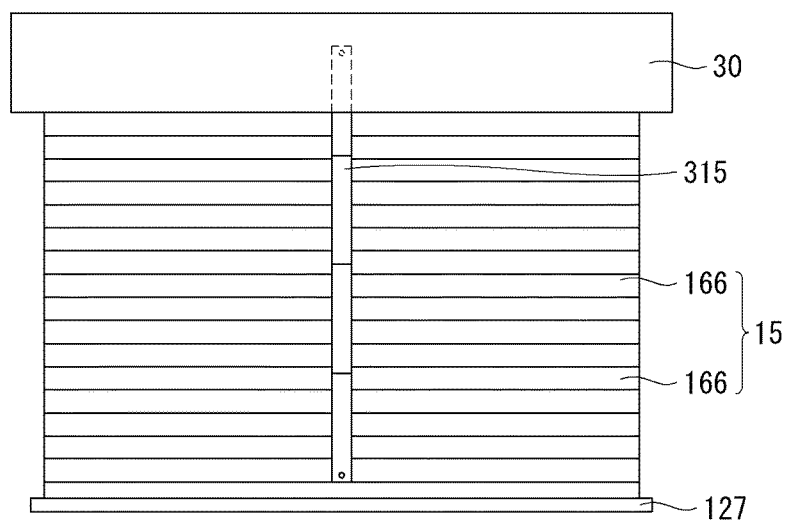
FIGS. 21(a) and 21(b) are views showing a position of a telescopic bar according to an exemplary embodiment of the present invention.
Figure 21B:
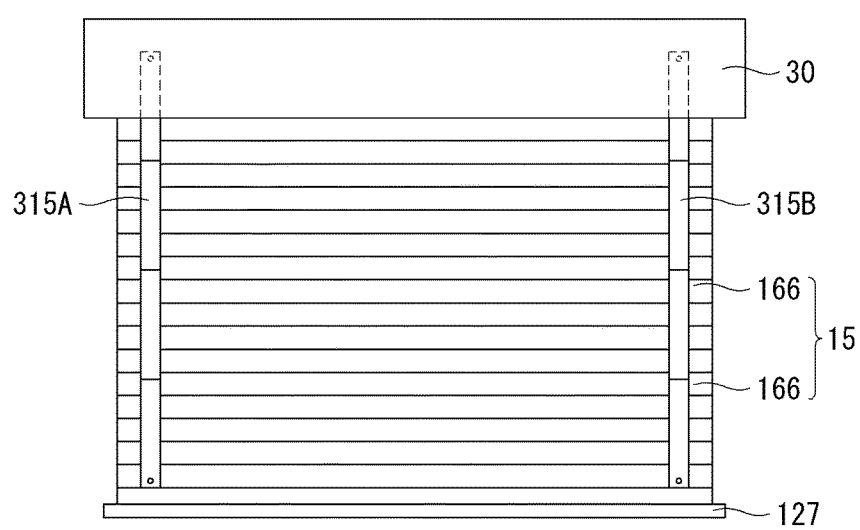

Referring to FIG. 21, the telescopic bar 315 may be positioned at the center of the display portion, as illustrated in (a) of FIG. 21. That is, a single telescopic bar 315 may support the module cover 15 from the back. In this case, costs can be saved because only one telescopic bar 315 is equipped in the display device. Moreover, the sole telescopic bar 315 at the center may help keep the display portion from slanting to one side.

As illustrated in (b) of FIG. 21, the telescopic bar 315 may be positioned on either side of the display portion. That is, two telescopic bars 315 may support the module cover 15 from the back. In this case, the display portion may remain flat because the telescopic bars 315 support the display portion on two sides.

While this drawing illustrates that one or two telescopic bars 315 are positioned on the display portion, the present invention is not limited to such a configuration, but more telescopic bars 315 may be provided as long as the center of weight is at the center of the display portion.

Figure 22:
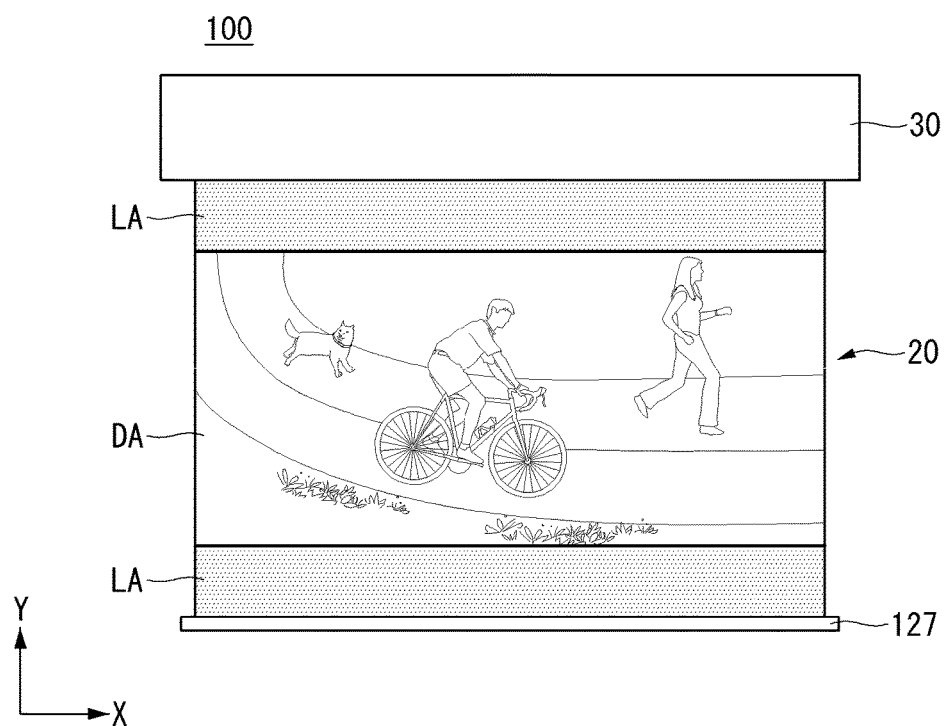
FIG. 22 is a view showing a display device according to an exemplary embodiment of the present invention.

Referring to FIG. 22, in the display device according to the present invention, the display portion 20 may include a display area DA and a letterbox area LA. The display area DA may be a part where the display screen is presented, and the letterbox area LA may be a part where the display screen is not presented.

For example, the display area DA may be positioned at the center of the display portion 20. That is, the letterbox area LA may be positioned in the top and bottom parts of the display area DA.

In the display device according to the present invention, the display area DA may be positioned only in some parts of the display portion 20. In this case, the screen ratio of the display screen may be changed. For example, if the display area DA is positioned over the entire display portion 20, the screen ratio of the display screen may be 16:9. Also, if the display area DA is positioned in some parts of the display portion 20, the screen ratio of the display screen may be 21:9. Accordingly, the user can watch a high-resolution movie without tearing.

Figure 23:
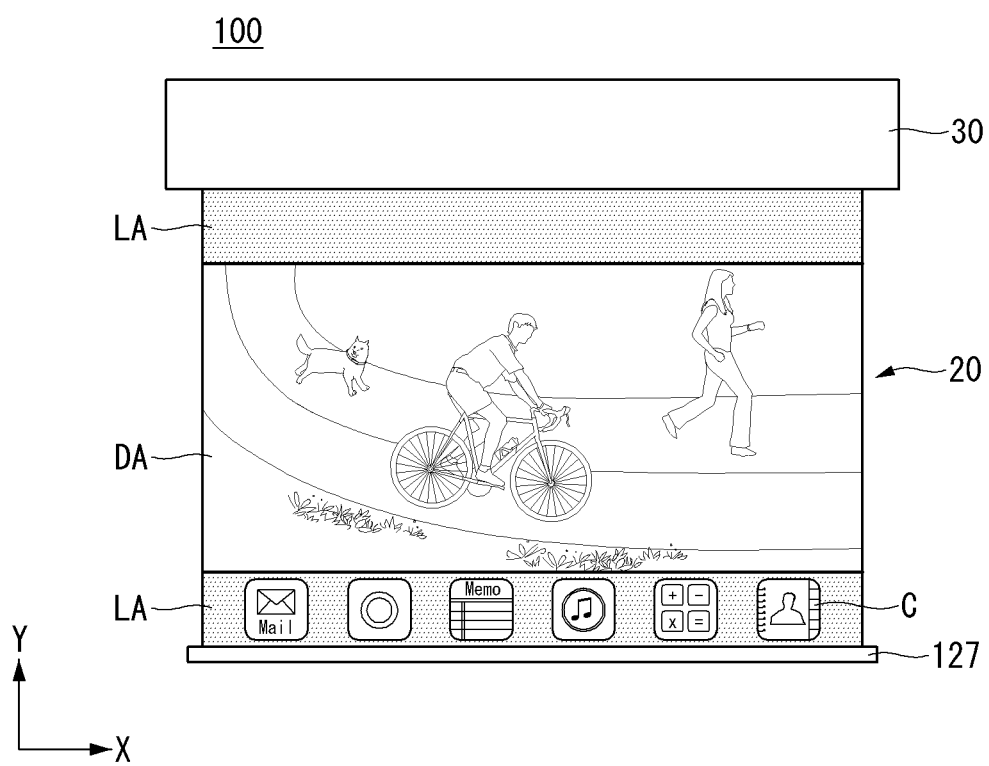
FIG. 23 is a view showing a display device according to an exemplary embodiment of the present invention.

Referring to FIG. 23, at least one application C may be shown in the letterbox area LA. The at least one application C may be spaced apart from one another within the letterbox area LA. For example, the at least one application C may be a variety of applications including movie player applications, music player applications, gaming applications, etc. The user may execute the application C by touching it or with a remote control.

In the display device according to the present invention, the application C may be shown only in the letterbox area LA. Thus, the application C may not obstruct the display screen in the display area DA. Accordingly, the user may be able to immerse themselves into the display screen.

Figure 24A:
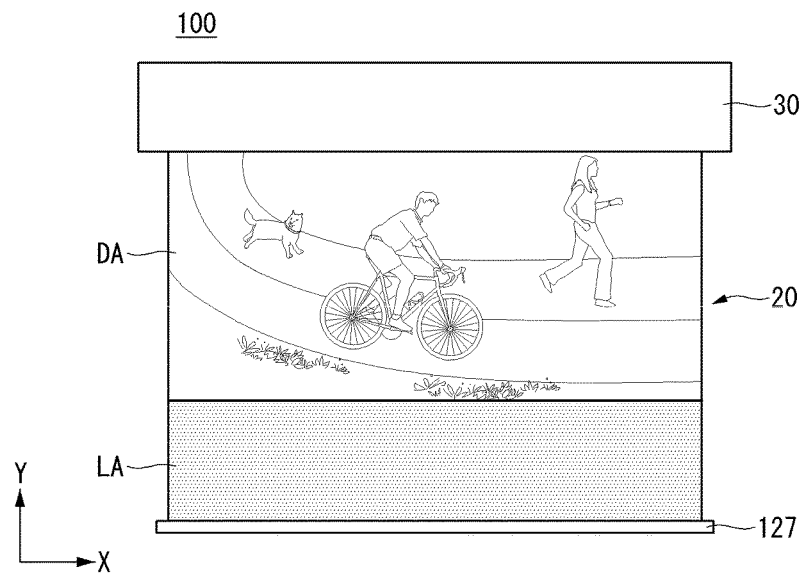
FIGS. 24(a) and 24(b) are views showing a display device according to an exemplary embodiment of the present invention.
Figure 24B:
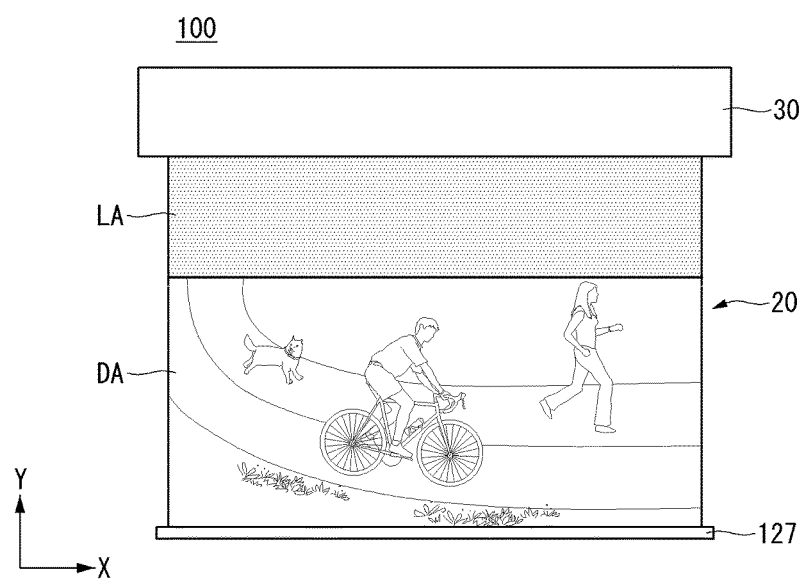

Referring to FIG. 24, in the display device according to the present invention, the display area DA may be positioned in other parts other than at the center of the display portion 20.

As illustrated in (a) of FIG. 24, the display area DA may be positioned in the upper part of the display portion 20. In this case, the letterbox area LA may be positioned in the lower part of the display portion. That is, the letterbox area LA may be positioned only under the display area DA.

In contrast, as illustrated in (b) of FIG. 24, the display area DA may be positioned in the lower part of the display portion 20. In this case, the letterbox area LA may be positioned in the upper part of the display portion. That is, the letterbox area LA may be positioned only over the display area DA.

While this drawing illustrates that the display area DA is positioned in the upper or lower part of the display portion, the present invention is not limited to such a configuration, but the display area DA may be positioned in any part of the display portion 20. The controller may send a control signal to allow the display area DA in the display portion 20 to be freely positioned wherever it is convenient.

Figure 25A:
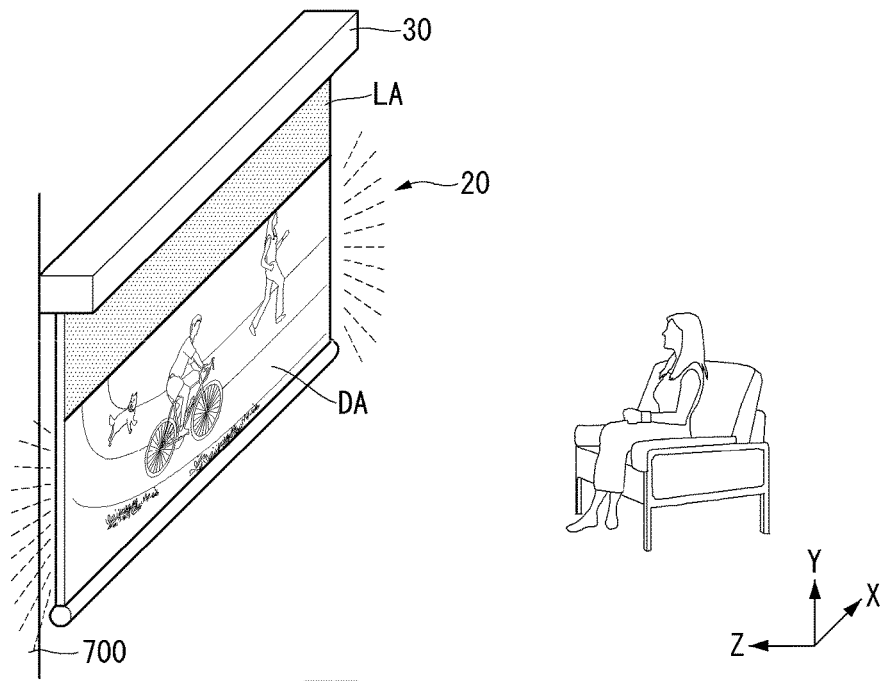
FIGS. 25(a) and 25(b) are views showing a display device according to an exemplary embodiment of the present invention.
Figure 25B:
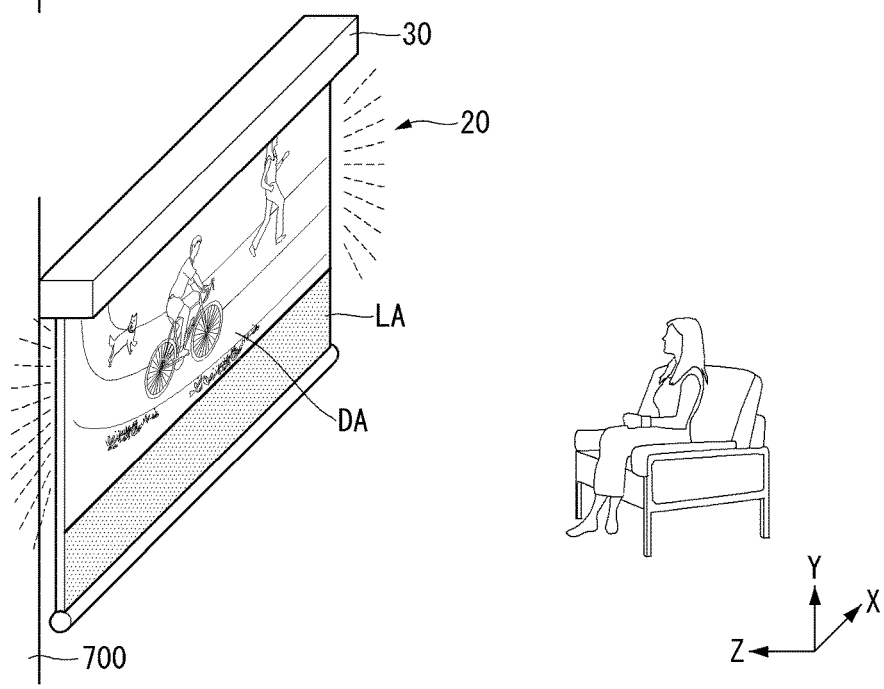

Referring to FIG. 25, sound may be radiated only from the display area DA. That is, only the part of the speaker connecting portions (242 of FIG. 14) that corresponds to the display area DA may radiate sound. As illustrated in (a) of FIG. 25, if the display area DA is positioned in the lower part of the display portion 20, only the part of the speaker connecting portions (242 of FIG. 14) positioned in the lower part of the display portion 20 may radiate sound. Likewise, as illustrated in (b) of FIG. 25, if the display area DA is positioned in the upper part of the display portion 20, only the part of the speaker connecting portions (242 of FIG. 14) positioned in the upper part of the display portion 20 may radiate sound.

In this case, the display screen and the sound emitting portion may be at the same location. This may make it easier for the user to immerse themselves into the screen because audio information and video information come from the same location. Also, in the display device according to the present invention, only some of the speaker connecting portions (242 of FIG. 14) may radiate sound. Accordingly, the power consumption of the display device may be reduced.

Figure 26A:
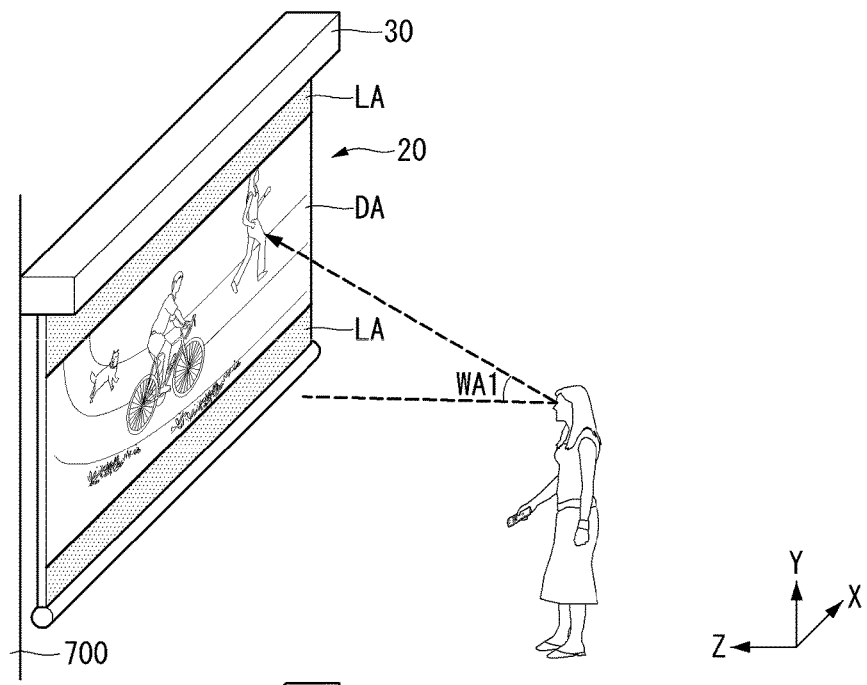
FIGS. 26(a) and 26(b) are views showing a display device according to an exemplary embodiment of the present invention.
Figure 26B:
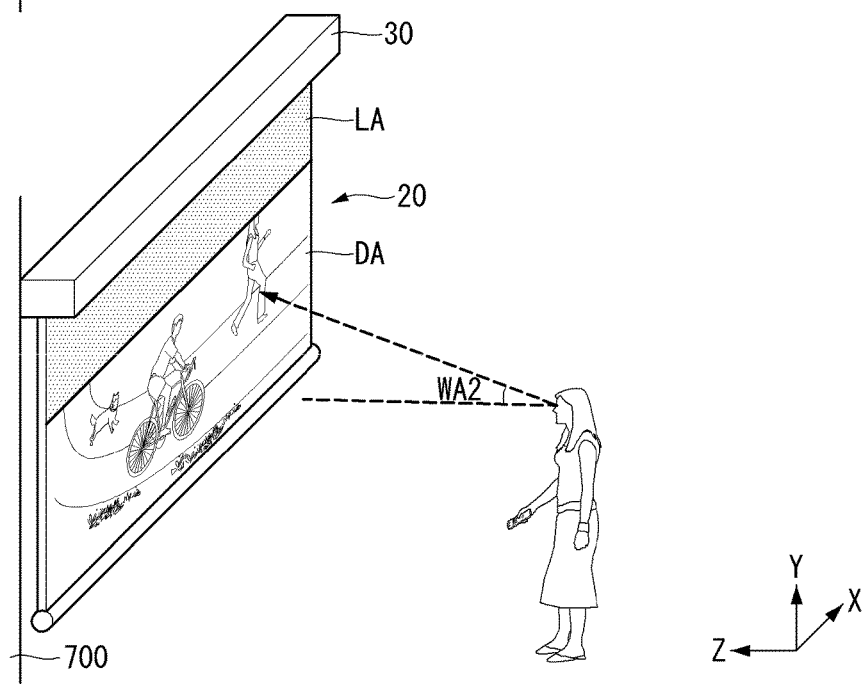

Referring to FIG. 26, the display area DA may be positioned in the center of the display portion 20, as illustrated in (a) of FIG. 26. Since the display device is attached to an upper part of the target surface 700, this may require the user to look up at a first angle WA1 from the ground when viewing the display area DA. This will put stress on the user's neck and make the user easily tired, thus making it difficult for them to immerse themselves into the display screen.

To avoid this, the user may adjust the position of the display area DA to move it to the lower part of the display portion 20, as illustrated in (b) of FIG. 26. For example, the user may use the remote control to allow the controller to change the position of the display area DA. After moving the display area DA down, the user may look up at a second angle WA2 from the ground when viewing the display area DA. The second angle WA2 may be smaller than the first angle W1. In this case, the user can view the display screen more comfortably and therefore immerse themselves into the screen.

Figure 27A:
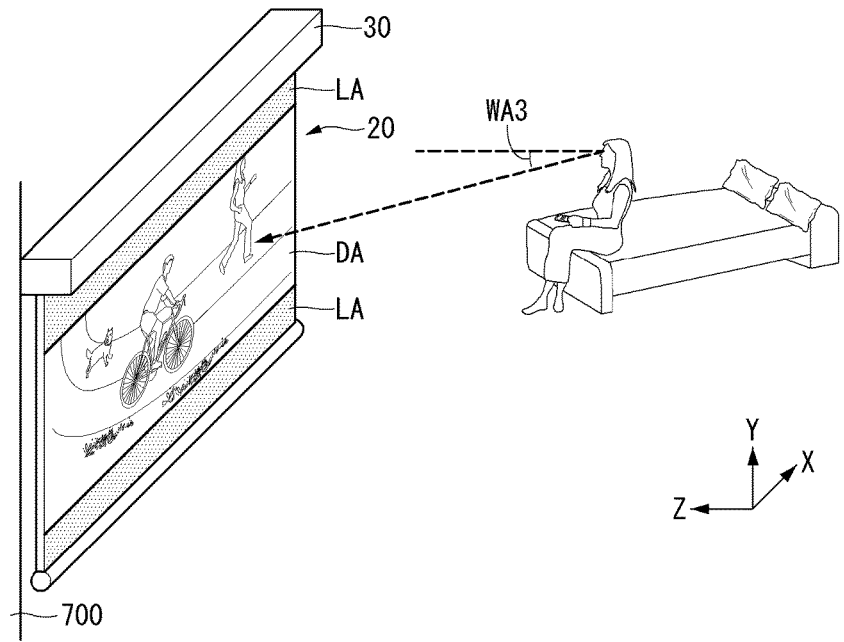
FIGS. 27(a) and 27(b) are views showing a display device according to an exemplary embodiment of the present invention.
Figure 27B:
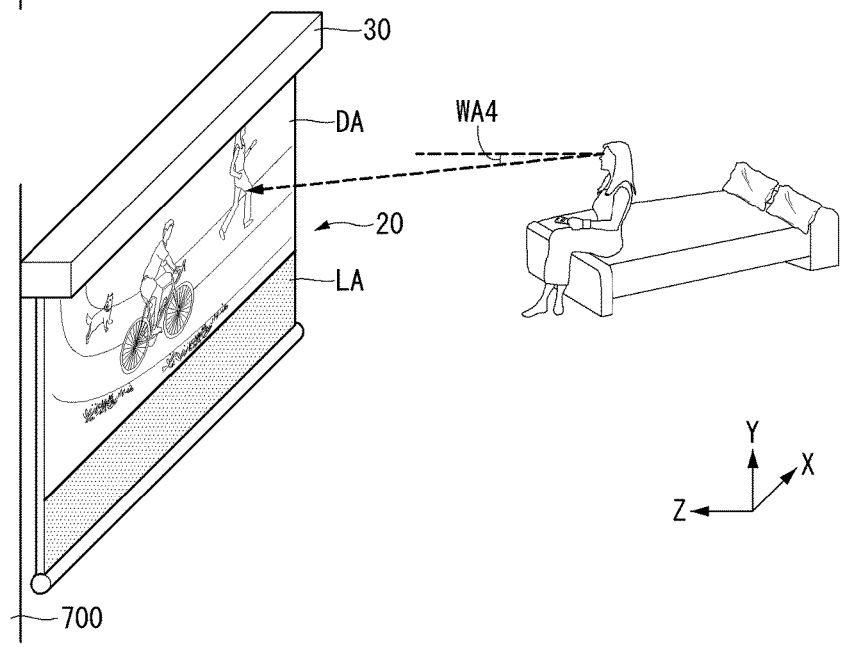

Referring to FIG. 27, the display area DA may be positioned in the center of the display portion 20, as illustrated in (a) of FIG. 27. Since the display device is attached to a lower part of the target surface 700, this may require the user to look down at a third angle WA3 from the ground when viewing the display area DA. This will make the user's eyes easily tired, thus making it difficult for them to immerse themselves into the display screen.

To avoid this, the user may adjust the position of the display area DA to move it to the upper part of the display portion 20, as illustrated in (b) of FIG. 27. For example, the user may use the remote control to allow the controller to change the position of the display area DA. After moving the display area DA up, the user may look down at a fourth angle WA4 from the ground when viewing the display area DA. The fourth angle WA4 may be smaller than the third angle W3. In this case, the user will feel less tired while viewing the display screen and therefore immerse themselves into the screen.

Referring to FIG. 28, when the display portion 20 is unwound from the panel roller within the housing 30, the screen may not be presented on the entire display portion at first. That is, the display portion 20 may be entirely comprised of the letterbox area LA. Although not shown, at least one application may be shown in the letterbox area LA.

When the display portion 20 reaches a given ratio, the screen may be presented on the entire display portion 20. That is, the display portion 20 may be entirely comprised of the display area DA. The given ratio may be a ratio that is input or preset by the user.

Once the display portion 20 is unwound from the panel roller long enough to reach the given ratio or higher, the display area DA may keep its size and the letterbox area LA may be formed in the upper part of the display portion 20. As the display portion is unwound from the panel roller, the letterbox area LA in the upper part of the display portion 20 may grow larger. That is, the display area DA may be positioned in the lower part of the display portion 20, regardless of whether the display portion 20 is wound or unwound.

In the display device according to the present invention, the display panel may be an organic light-emitting display panel. That is, the display panel may emit itself without a backlight unit. Accordingly, the controller may control individual pixels to emit light only in a desired part, such as the display area DA, and display an image. Since the pixels emit light only in a desired part, the power consumption of the display device can be reduced.

While the aforementioned drawings are illustrated in relation to a structure of a display device in which the display portion is rolled up from inside the housing, the present invention is not limited to this structure but may be applicable to a structure of a display device in which the display portion is rolled down from inside the housing.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a housing;
   at least one roller configured to be positioned within the housing;
   a display portion comprising a display panel and a module cover; and a telescopic bar, one end of which is fixed to the interior of the housing and the other end is fixed to the bottom end of the display portion, wherein the display panel and the module cover are either in a first state where the display panel and the module cover are kept wound around the at least one roller or in a second state where the display panel and the module cover are kept unwound from the at least one roller, in contact with each other, and exposed out of the housing.

2. The display device of claim 1, further comprising a controller configured to send a control signal, wherein the controller is configured to send a control signal such that, when the display portion changes from the first state to the second state, a first speed at which the display portion is initially unwound from the roller and a second speed just before a set or input screen ratio is reached are different.

3. The display device of claim 2, wherein the first speed is faster than the second speed.

4. The display device of claim 2, wherein the set screen ratio is a screen ratio just before the display device is powered off.

5. The display device of claim 1, further comprising:
a controller configured to send a control signal; and
an indicator configured to be attached to one side of the housing,
wherein the controller is configured to send a control signal to enable the indicator to show the percentage of the set or input screen ratio to the current screen ratio.

6. The display device of claim 1, wherein the display portion comprises:
a display area where the display screen is presented; and
a letterbox area where the display screen is not presented.

7. The display device of claim 6, wherein the display area is configured to be positioned at the center of the display portion, and the letterbox area is configured to be positioned in the top and bottom parts of the display area.

8. The display device of claim 6, wherein at least one application is shown in the letterbox area.

9. The display device of claim 6, further comprising a controller configured to send a control signal, wherein the controller is configured to send a control signal to move the display area within the display portion.

10. The display device of claim 9, wherein the controller is configured to send a control signal to move the display area to the upper part of the display portion.

11. The display device of claim 9, wherein the controller is configured to send a control signal to move the display area to the lower part of the display portion.

12. The display device of claim 1, wherein the telescopic bar is configured to be stretched in conjunction with the display portion, during the transition from the first state to the second state.

13. The display device of claim 1, wherein the telescopic bar comprises first to four bars,
wherein the second to fourth bars are configured to be sequentially inserted into the first bar.

14. The display device of claim 13, wherein the sides of the first to fourth bars that make contact with the module cover are the same height.

15. The display device of claim 1, wherein the telescopic bar is configured to be positioned at the center of the display portion.

16. The display device of claim 1, wherein the telescopic bar is configured to be positioned on either side of the display portion.

17. The display device of claim 1, further comprising a bottom bar configured to be positioned on one end of the display portion,
wherein the bottom bar comprises a magnetic material.

18. The display device of claim 1, further comprising at least one speaker connecting portion configured to be positioned between the module cover and the display panel,
the speaker connecting portion comprising:
shakers configured to be positioned on the aprons; and
transmitting portions configured to shield at least one side of the shakers.

19. The display device of claim 18, wherein the transmitting portions comprise a magnetic material.

20. The display device of claim 18, wherein the transmitting portions comprise a flexible material.

* * * * *